US009827754B2

(12) United States Patent
Swartz et al.

(10) Patent No.: US 9,827,754 B2
(45) Date of Patent: Nov. 28, 2017

(54) METHODS AND APPARATUS FOR 3D FABRICATION

(75) Inventors: Robert Swartz, Highland Park, IL (US); Buckley Crist, Wilmette, IL (US); Joseph Fallon, Oak Forest, IL (US)

(73) Assignee: Impossible Objects, LLC, Northbrook, IL (US)

(*) Notice: Subject to any disclaimer, the term of this patent is extended or adjusted under 35 U.S.C. 154(b) by 1137 days.

(21) Appl. No.: 13/582,939

(22) PCT Filed: Aug. 29, 2012

(86) PCT No.: PCT/US2012/052946
§ 371 (c)(1),
(2), (4) Date: Nov. 2, 2012

(87) PCT Pub. No.: WO2013/033273
PCT Pub. Date: Mar. 7, 2013

(65) Prior Publication Data
US 2013/0171431 A1  Jul. 4, 2013

Related U.S. Application Data

(60) Provisional application No. 61/528,537, filed on Aug. 29, 2011.

(51) Int. Cl.
*B29C 65/02* (2006.01)
*B29C 65/52* (2006.01)
(Continued)

(52) U.S. Cl.
CPC ...... *B32B 37/1284* (2013.01); *B29C 67/0074* (2013.01); *B29C 67/0077* (2013.01);
(Continued)

(58) Field of Classification Search
USPC ........ 156/379.6, 380.6, 384, 387, 390, 524, 156/538, 539, 578, 583.1
See application file for complete search history.

(56) References Cited

U.S. PATENT DOCUMENTS

| 3,431,166 A | 3/1969 | Mizutani et al. |
| 4,312,268 A | 1/1982 | King et al. |

(Continued)

FOREIGN PATENT DOCUMENTS

| CN | 101181776 A | 5/2008 |
| CN | 201329424 Y | 10/2009 |

(Continued)

OTHER PUBLICATIONS

Extended European Search Report, from EP Application No. 12828967, Jun. 9, 2015, EP.
(Continued)

*Primary Examiner* — Sing P Chan
(74) *Attorney, Agent, or Firm* — Flachsbart & Greenspoon, LLC

(57) ABSTRACT

In an illustrative implementation of this invention, a 3D object comprises substrate layers infiltrated by a hardened material. The 3D object is fabricated by a method comprising the following steps: Position powder on all or part of a substrate layer. Repeat this step for the remaining substrate layers. Transform the powder into a substance that flows and subsequently hardens into the hardened material. The hardened material solidifies in a spatial pattern that infiltrates positive regions in the substrate layers and does not infiltrate negative regions in the substrate layers.

20 Claims, 13 Drawing Sheets

(51) Int. Cl.

| | | |
|---|---|---|
| *B32B 37/06* | (2006.01) | |
| *B32B 37/10* | (2006.01) | |
| *B32B 37/12* | (2006.01) | |
| *B32B 37/24* | (2006.01) | |
| *B32B 38/10* | (2006.01) | |
| *B32B 38/14* | (2006.01) | |
| *B32B 38/18* | (2006.01) | |
| *B32B 39/00* | (2006.01) | |
| *B32B 43/00* | (2006.01) | |
| *B32B 5/26* | (2006.01) | |
| *B32B 7/14* | (2006.01) | |
| *B29C 67/00* | (2017.01) | |
| *B32B 5/02* | (2006.01) | |
| *B32B 1/00* | (2006.01) | |
| *B33Y 10/00* | (2015.01) | |
| *B33Y 30/00* | (2015.01) | |

(52) U.S. Cl.
CPC ............... *B32B 1/00* (2013.01); *B32B 5/022* (2013.01); *B32B 5/024* (2013.01); *B32B 5/26* (2013.01); *B32B 7/14* (2013.01); *B32B 2260/021* (2013.01); *B32B 2260/04* (2013.01); *B33Y 10/00* (2014.12); *B33Y 30/00* (2014.12); *Y10T 428/2481* (2015.01); *Y10T 428/24826* (2015.01); *Y10T 428/24843* (2015.01)

(56) References Cited

U.S. PATENT DOCUMENTS

| | | | |
|---|---|---|---|
| 4,393,389 A | 7/1983 | Rasekhi et al. | |
| 4,453,694 A | 6/1984 | Andreasson | |
| 4,863,538 A | 9/1989 | Deckard | |
| 5,176,949 A | 1/1993 | Allagnat et al. | |
| 5,204,055 A | 4/1993 | Sachs et al. | |
| 5,260,009 A | 11/1993 | Penn | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,637,175 A | 6/1997 | Feygin et al. | |
| 5,876,550 A | 3/1999 | Feygin et al. | |
| 5,988,959 A | 11/1999 | Sugata | |
| 6,147,138 A * | 11/2000 | Hochsmann | B29C 67/0081 523/139 |
| 6,161,995 A | 12/2000 | Wakazono et al. | |
| 6,471,800 B2 | 10/2002 | Jang et al. | |
| 6,551,038 B1 | 4/2003 | Sugata et al. | |
| 6,596,224 B1 | 7/2003 | Sachs et al. | |
| 6,632,054 B2 | 10/2003 | Geiger et al. | |
| 6,740,185 B2 | 5/2004 | Baldwin | |
| 6,780,368 B2 | 8/2004 | Liu et al. | |
| 8,377,547 B2 | 2/2013 | Noguchi et al. | |
| 2002/0104935 A1 | 8/2002 | Schweizer | |
| 2004/0070582 A1 | 4/2004 | Smith et al. | |
| 2004/0112523 A1 | 6/2004 | Crom et al. | |
| 2005/0059757 A1 | 3/2005 | Bredt et al. | |
| 2006/0061618 A1 | 3/2006 | Hernandez et al. | |
| 2007/0241482 A1* | 10/2007 | Giller | B29C 67/0066 264/494 |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2012/0059503 A1 | 3/2012 | Pax et al. | |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0339645 A1 | 11/2016 | Swartz et al. | |

FOREIGN PATENT DOCUMENTS

| | | |
|---|---|---|
| CN | 1041509150 A | 11/2014 |
| EP | 2776233 A2 | 9/2014 |
| EP | 2961585 A2 | 1/2016 |
| JP | H11236541 | 8/1999 |
| WO | WO 2007/114895 A2 | 10/2007 |
| WO | WO-2013010108 A1 | 1/2013 |
| WO | WO-2013033273 A2 | 3/2013 |
| WO | WO-2014134224 A2 | 9/2014 |

OTHER PUBLICATIONS

International Search Report and Written Opinion, mailed Jan. 10, 2013, PCT/US12/52946, International filing date Aug. 29, 2012.
J. Eitgen, A Short Review of Magnetography and its Related Materials Problems, Ind. Eng. Chem. Prod. Res. Dev., 1985, 24 (2), pp. 196-201, American Chemical Society, Jun. 1985.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.
Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.
Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 (" . . . Metal Matrix Composites . . . "), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.
Non-Final Rejection in U.S. Appl. No. 14/566,661 ("Tow Stabilization Method and Apparatus"), dated Mar. 21, 2017.
Applicant Initiated Interview Summary in U.S. Appl. No. 14/703,372 (" . . . Flattened Substrate Sheets"), mailed Feb. 9, 2017.

(56) References Cited

OTHER PUBLICATIONS

Invitation to Pay Additional Fees in PCT/US17/17672 ("Method and Apparatus for Automated Composite-Based Additive Manufacturing"), mailed Apr. 17, 2017.
Non-Final Rejection in U.S. Appl. No. 13/582,939 ("Methods and Apparatus for 3D Fabrication"), mailed Apr. 27, 2017.
Decision on Protest for PCT/US17/17672 ("Method and Apparatus for Automated Composite-Based Additive Manufacturing"), mailed May 26, 2017.

* cited by examiner

METHODS AND APPARATUS FOR 3D FABRICATION

RELATED APPLICATIONS

This application claims the priority of U.S. Provisional Application No. 61/528,537 filed Aug. 29, 2011, the entire disclosure of which is herein incorporated by reference.

FIELD OF THE INVENTION

This invention relates generally to the field of 3D fabrication.

SUMMARY OF THE INVENTION

In exemplary implementations of this invention, a 3D object is formed layer by layer, as follows: Thermoplastic powder (or thermosettable plastic powder) is selectively deposited on one layer of substrate, then on a second layer of substrate, then on a third, and so on.

The powder may comprise polyethylene and the substrate layers may comprise woven or nonwoven sheets of polylactic acid (PLA). However, a variety of materials may be used for the powder and substrate, respectively, and the substrate need not be either woven or fibrous.

A computer processor controls the selective deposition of the powder, based on a CAD model of the 3D object. The CAD model is divided into thin sections or "slices". On each substrate layer, the powder is deposited only in some areas, and not in others. The pattern in which the powder is selectively deposited on each substrate layer, respectively, corresponds to a positive image of one of the slices. That is, for each slice of the 3D object: (a) powder is deposited in positions that correspond to positions in the slice where the 3D object exists, and (b) powder is not deposited in positions that correspond to positions in the slice where the 3D object does not exist.

To build up the 3D object layer by layer, the substrate layers are aligned with each other and placed one on top of one another.

Heat is applied (or heat and pressure are applied) to the powder and substrate, causing the powder, not the substrate, to melt. The resulting molten material coats the substrate. The molten material then cools and solidifies. The solidified material holds adjacent layers of substrate together. For example, the solidified material may bridge between different layers of the substrate. In this manner, a part of each layer of substrate is coated by this solidified material. In some implementations, heat and pressure are applied once per layer. In other implementations, they are applied less frequently (e.g., once every two layers, or less frequently).

At least once in the process (e.g., at the end of the process), excess substrate is removed. The excess substrate is that portion of each substrate layer that is not coated by the solidified material. Removal of the excess substrate may be accomplished, for example, by dissolution or polymer degradation. In those cases, the solvent or degrading agent employed depends on the substrate material that is employed. For example, if the substrate comprises PLA fabric, then potassium hydroxide in methanol may be used to dissolve the excess (uncoated) portion of each substrate layer. Or, for example, if the substrate comprises polyvinyl alcohol (PVOH) fabric, then water may be used to dissolve the excess substrate.

The desired 3D object is defined by that portion of layers where the powder has been selectively deposited and melted (i.e., that portion which is coated by the solidified material once the melted powder cools and solidifies).

The entire process (or parts of the process) may be automated and computer controlled. For example, one or more of the following may be automated and computer controlled: the selective deposition of powder, removal of excess powder, feeding of substrate sheets, heating and pressing, and removal of excess substrate.

The 3D object that is printed comprises a composite material (the solidified plastic and the substrate that it coats).

This invention has numerous advantages over existing technology. Among other things, in exemplary embodiments: First, it can be used with a wide variety of materials for the powder, substrate and solvent or degrading agent. Second, it produces composite materials, and thus can print 3D objects with highly desirable material properties, such as high strength and low weight. Third, it can fabricate objects at a very rapid pace, in some implementations. Fourth, it can also produce much larger objects than present technology and the parts can be colored or decorated.

The above description of the present invention is just a summary. It is intended only to give a general introduction to some illustrative implementations of this invention. It does not describe all of the details of this invention. This invention may be implemented in many other ways, including with thermosettable powder.

BRIEF DESCRIPTION OF THE DRAWINGS

FIG. 7 shows a pattern that has been inkjet-printed on a substrate layer. The pattern comprises a 4×3 matrix. In each tile of the matrix, respectively, a different cross-sectional "slice" of the ring torus has been printed by the inkjet printer.

FIG. 8 shows a compressive device, after a number of substrate tiles (layers) have been placed in it, one on top of the other in a compressive device. The tiles are aligned by inserting two registration pins of the compressive device into the two registration holes of each tile, respectively.

FIG. 9 shows a compressive device, after substrate layers with all of the "slices" of the ring torus have been inserted into it. Springs in the compressive device press the substrate layers together.

FIG. 10 shows layers of substrate that have been fused together into a rectangular cuboid.

FIG. 11 shows a ring torus that remains after excess substrate in a rectangular cuboid has been removed.

The above Figures show all or part of illustrative embodiments of this invention, or of products of those embodiments. The Figures do not show all of the details of the invention.

DETAILED DESCRIPTION OF THE INVENTION

Overview:

In exemplary implementations of this invention, a 3D object is formed, layer by layer. Powder is selectively deposited on each layer. The powder is melted, so that it coats a portion of the substrate layer. The melted powder then solidifies, bonding layers of substrate together. The excess substrate (which is not coated by the solidified material) is subsequently removed.

Figure 1A:
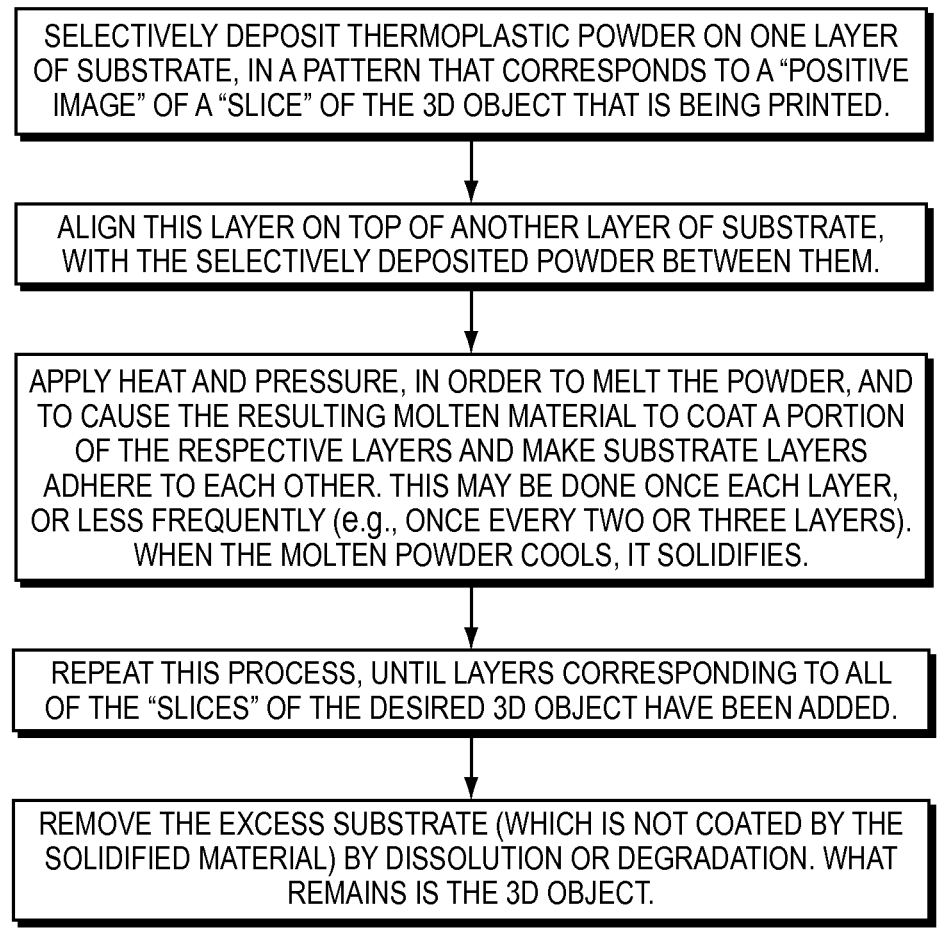
FIG. 1A is a high-level flow chart of steps used to manufacture a 3D object, in an exemplary embodiment of this invention.
Figure 1B:
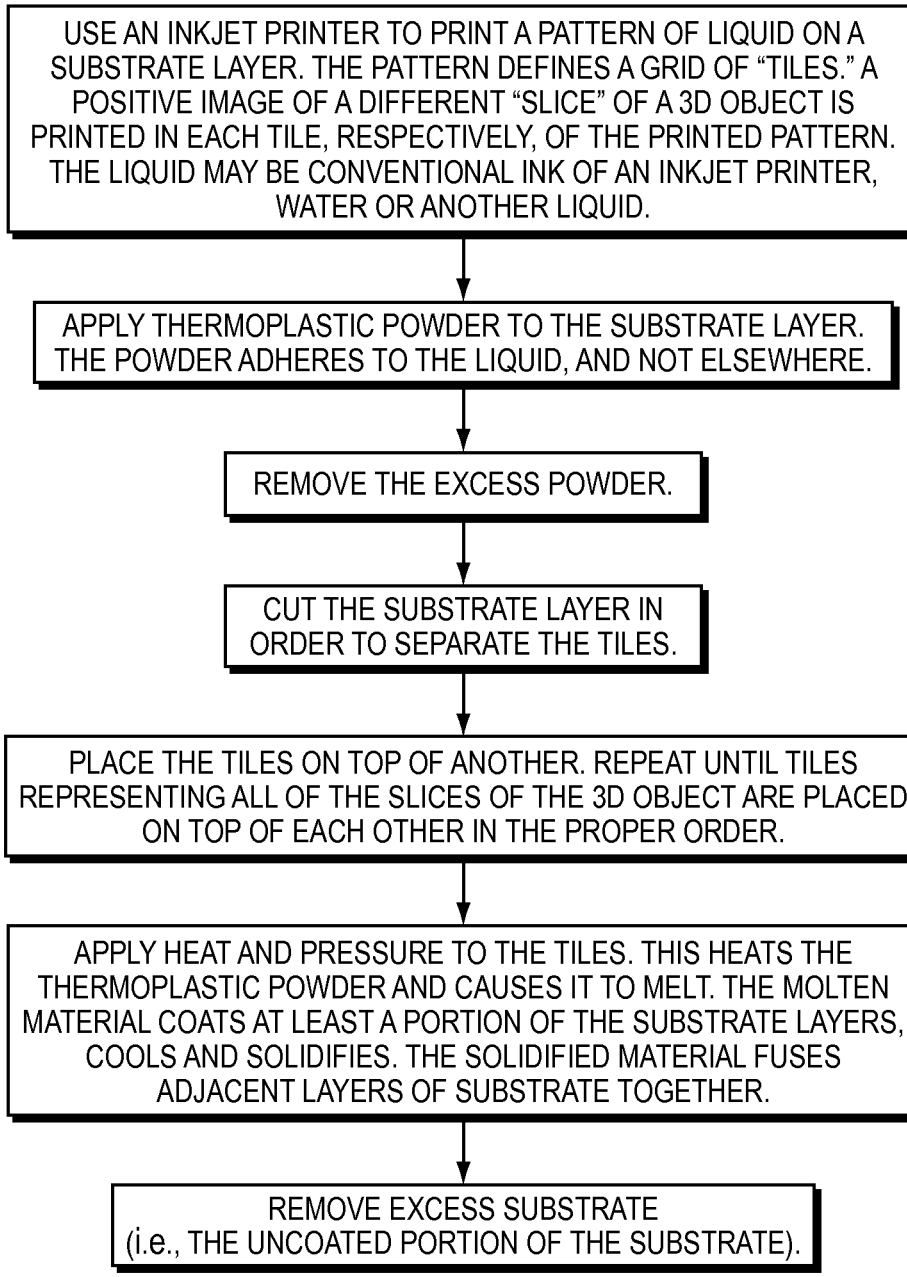
FIG. 1B is a high-level flow chart of steps used to manufacture a 3D object, in another exemplary embodiment of this invention.

FIGS. 1A and 1B are each flow charts of steps used to manufacture a 3D object, in two illustrative embodiments of this invention, respectively.

In illustrative implementations of this invention, the 3D object is printed in accordance with a computer 3D model of the object, created by a CAD program. For example, the CAD program may be a free-form NURBS (non-uniform rational basis spline) program, such as Rhinoceros® (available from McNeel North America, Seattle, Wash.). Or, for example, the CAD program may be SolidWorks® (available from Dassault Systémes SolidWorks Corp., Concord, Mass.).

On each substrate layer, powder is selectively deposited in a physical pattern that corresponds to a "positive image" of a thin slice or section of the 3D object. That is, for each slice of the 3D object: (a) powder is deposited in positions that correspond to positions in the slice where the 3D object exists, and (b) powder is not deposited in positions that correspond to positions in the slice where the 3D object does not exist.

Thin slices of the 3D CAD model may be created, for example, by starting with a 3D model in STL file format and using the Slice Commander feature of Netfabb® Studio software (available from netfabb GmbH, Parsberg, Germany) to create the thin slices.

Selective Deposition of Powder:

According to principles of this invention, the powder may be selectively deposited on substrate layers in many different ways. Here are four examples:

Example 1 (of Selective Deposit of Powder)

First, powder may be selectively deposited on a substrate layer by making the powder adhere to a liquid, as follows: A liquid is selectively deposited on a substrate layer, so that some parts of the substrate layer are covered with liquid, and some are not. Then the side of the substrate layer on which the fluid was deposited is flooded with powder (e.g., the powder is poured on this side of the substrate layer). The powder adheres to the liquid. The excess powder (i.e., the powder that is not adhering to the liquid) is removed. For example, this excess powder may be removed by vacuuming. Or, for example, the substrate may simply be flipped over, so that the excess powder falls off. Or the substrate may be turned upside down and flicked with a finger. The substrate may be vibrated while the excess powder is removed, in order to facilitate the removal. In some cases, the liquid that is selectively deposited is water (or an aqueous solution that includes a material that slows the evaporation of water). For example, the material may be 2-pyrrolidinone. In other cases, it is a different liquid, such as an alcohol. For example, if the substrate is water sensitive (e.g. if the substrate is polyvinyl alcohol, PVOH), then water may distort or dissolve the substrate. In that case, an alcohol may be used as the liquid that is selectively deposited. In some cases, to prevent the liquid that is selectively deposited from spreading or being excessively absorbed into the substrate, it is helpful to apply a surface energy modifier to the substrate, before selectively depositing the liquid. For example, Scotchguard® Fabric & Upholstery Protector (available from 3M, St. Paul, Minn.) may be sprayed or deposited on the substrate layer for this purpose. Alternately, other repellents or surface energy modifiers can be used.

In this first example, a variety of methods may be used to dispense the liquid. For example, a thermal inkjet head or a piezoelectric inkjet head may be used to dispense the liquid. For example, the inkjet head may comprise a HP45 cartridge, HP C 6602A cartridge, or HP51604A cartridge (available from Hewlett Packard Corp.) or a Lexmark® 50 cartridge or Lexmark 60 cartridge. Alternately, air pressure may be used to dispense the liquid (e.g., through a 0.005 inch nozzle obtained from the Lee Company, Essex, Conn., part INZA650935K). If air pressure is used, the release of air or dispensing of liquid may be controlled by a solenoid valve Example 2 (of Selective Deposit of Powder)

Second, the powder may be selectively deposited by flooding one side of a layer of substrate with powder, then selectively heating the opposite side of the substrate with an appropriate device such as a thermal print head. (For example, a thermal print head from Mitani Micronics Co., Ltd., Tokyo, Japan may be used). In this approach, the thermal print head includes a high-resolution array of heating elements, which may be selectively turned on or off. In the areas that are heated, the powder melts and adheres to the substrate. The excess powder that has not adhered is removed. Again, this may be done by vacuuming the excess powder, or by simply flipping the substrate layer over. Again, vibration may be used to facilitate the removal of the powder. The thickness of the deposited powder can be controlled in this example by doctoring a precise thickness of powder on the substrate.

Example 3 (of Selective Deposit of Powder)

Third, powder may be deposited using a selective deposition technique similar to that employed in xerographic printing. In this second approach, an electrical charge is imparted to powder particles, which are directed toward the substrate layer, and then selectively adhere to some portions of the substrate but not others, due to electrostatic attraction or repulsion. The powder particles adhere to portions of the substrate that have an opposite electrical charge (or that are adjacent to a surface that has such a charge), and are repelled from portions of the substrate that have the same electrical charge (or that are adjacent to a surface that has such a charge).

Example 4 (of Selective Deposit of Powder)

Fourth, the powder may be deposited using a selective deposition technique similar to that employed in magnetographic printing. In this fourth approach, powder selectively adheres to some portions of the substrate layer, but not others, due to magnetostatic interactions between the powder and the substrate layer (or a surface adjacent to the substrate layer). For example, the powder may be a single component magnetic toner, or may comprise a colloidal suspension (e.g., a ferrofluid) or may be a dual component toner. A variety of magnetic pigments, such as magnetite ($Fe_3O_4$) or ferric oxide (($Fe_2O_3$), may used for the toner in this approach.

General Observations (Selective Deposition of Powder):

In all of the above examples, the step of selectively depositing powder may include a substep of directing solid powder toward the substrate layer in a non-selective manner. For example, this substep may comprise flooding the entire layer of substrate with powder. Or, for example, in the xerographic or magnetographic examples, this substep may comprise sending electrically charged or magnetized powder toward the entire substrate layer.

This invention is not limited to the four examples of selective deposition described above, but may be implemented using any technique to selectively deposit the powder.

In exemplary implementations, liquid is selectively dispensed in a 2D pattern that corresponds to the slice that it is being printed for the particular substrate layer. After the liquid is dispensed on that substrate layer, the top of the substrate layer is then flooded with thermoplastic powder. The powder adheres to the liquid, but does not adhere to the portions of the substrate layer that are not covered with the liquid. The excess powder is then removed. This may be done, for example, by vacuuming the excess powder off, or by the simple expedient of flipping the substrate layer over.

Heat, Pressure:

In exemplary implementations of this invention, pressure and heat are applied to the layers of substrate being fused, to melt the powder and to press the layers together. The pressure may additionally tend to force the melted thermoplastic to coat the substrate.

For example, a hot stamp press may be used to apply heat and pressure. Or, for example, the substrate may be placed in a heated oven, while pressure is applied with a clamp or other compressive device. In both cases, once the powder melts, the pressure may tend to force the molten material to coat the substrate layers. In the case of oven heating, a tacking iron may be used to tack the substrate layers together, before inserting them into the oven.

In many implementations, the powder is caused to melt after it has been selectively deposited: i.e., the melting occurs after the excess powder has been removed.

However, if a thermal print head (with an array of heating elements) is used, then the melting is part of the process of selective deposition. The print head selectively heats portions of a substrate layer that has been flooded (on the side of the substrate layer opposite from the print head) with powder, so that, in the heated areas, the powder melts and adheres to the substrate. Excess powder is removed. Heat and pressure are then applied, causing the adhered material to melt (or to remain molten) and to coat part of the substrate.

The molten material then cools and solidifies into a solid that coats a portion of the substrate layer. It also holds multiple substrate layers together.

For example, if the substrate is fibrous, the molten material may coat these fibers. When the material solidifies, it continues to coat these fibers.

How frequently the powder is melted and the pressure is applied, may vary. In some implementations, these steps occur once for each layer. In other implementations, at least some of these steps occur less frequently. For example, heat and pressure may be applied only once for every two layers of substrate, or once for every five layers of substrate, etc.

Removal of Excess Substrate:

A portion of the substrate is not coated, because the powder was not present and melted in that area. That excess substrate is removed.

A variety of removal techniques may be employed. In some embodiments, excess substrate is removed by one or more of: dissolution, polymer degradation, mechanical abrasion, or melting. If dissolution or degradation is employed to remove excess substrate, the dissolution or degradation may be accelerated by agitating and/or heating the agent used for dissolution and/or degradation. For example, any of the following may be agitated or heated to speed the dissolution or degradation: (a) sodium hydroxide or other alkali in aqueous solution or in an alcohol (e.g., ethanol or methanol), (b) potassium hydroxide in an alcohol (e.g., methanol or in ethanol), (c) water, and (d) hydrochloric acid in aqueous solution. Agitation may be achieved, for example, by ultrasound, a magnetic or paddle stirrer, shaking, or jets of liquid. If mechanical abrasion is used, then it is advantageous to use a substrate material that can be easily removed by abrasion when not coated. The object may be placed in a mechanical tumbler to facilitate abrasion. This invention is not limited, however to the methods of removing excess substrate listed above. Other removal approaches may be employed which rely on a difference in material properties of the substrate and the solidified thermoplastic that causes the former to be more susceptible than the latter to the removal agent.

In exemplary implementations, the removal of the excess substrate occurs just once, at the end of the process. Alternately, the removal of the excess substrate may occur more than once during the process.

Thermoplastic or Thermosettable Powder:

In exemplary implementations, a thermoplastic powder is used. For example, the powder may be Shaetti® SF 400 or Shaetti® Fix 1820 thermoplastic powder (available from Shaetti America, Inc., Mooresville, N.C.) or another powder that melts, flows, and bonds under heat. The thermoplastic powder may comprise a polyethylene or other polyolefin. Advantageously, polyethylene may have a lower melting point than the substrate, and may be impervious to many solvents, acids and other chemicals that degrade plastics (and thus would not be affected if such chemicals were used to remove excess substrate).

Alternately, a thermosettable powder that melts and flows sufficiently to coat the substrate may be used.

Substrate/Removal of Excess Substrate:

Depending on the particular implementation of this invention, different types of substrates may be used, and, correspondingly, different materials may be used to dissolve or degrade excess substrate. The following table is a non-exhaustive list of some materials that may be used as the (1) substrate and (2) corresponding solvent or material for degradation.

TABLE 1

Substrates and Removal Agents

| Substrate | Material used for removal of excess substrate (e.g., by dissolution or degradation) |
| --- | --- |
| Polyethylene terephthalate (PET) | mixture comprising either: (1) alcohol and alkali (e.g., Everclear ® grain alcohol and sodium hydroxide) (the alcohol may comprise ethanol or methanol); or (2) methanol and potassium hydroxide. |
| polylactic acid (PLA) | (1) sodium hydroxide (in aqueous solution), or (2) potassium hydroxide (in methanol or ethanol) (3) Strip-X ® Stripper*(available from W. M. Barr & Co., Memphis, TN) |
| polyvinyl alcohol (PVOH) | water |
| polyamide (nylon) | hydrochloric acid |
| water soluble paper | water |
| paper | hydrochloric acid, or enzymes |
| silk | hydrochloric acid |
| fiberglass | hydrofluoric acid |

*Strip-X ® Stripper contains acetone, methanol, methylene chloride, toluene, and xylene.

For example, PLA (available from Ahlstrom Chirnsdale Ltd., Chirnsdale, Scotland, U.K., and from C.L. Enterprises, Wenzhou, China) may be used as the substrate.

In exemplary implementations, the substrate comprises a woven material. Alternately, the substrate may comprise a non-woven textile. For example, non-woven PVOH (available from Freudenberg USA) may be used as a substrate. Also, for example, the non-woven substrate may comprise HV 7841, HV 7801 or HV CTR2863A polyester, each available from Hollingsworth and Vose (East Walpole, Mass.), or may comprise A0514WHT polyester, available from Freudenberg. Or, for example, the substrate may comprise paper or another cellulose-based or plant fiber-based material.

As noted in the table above, water-soluble paper may be used for the substrate. For example, the water soluble paper may be of the type described in U.S. Pat. No. 3,431,166 (in which paper is reacted with alkali during manufacture). Or, for example, the paper may employ polyvinyl alcohol (PVOH) which is used to bind paper fibers together. The former type of water soluble paper may be obtained from Aquasol Corporation (North Tonawanda, N.Y.); and the latter type may be obtained from Hollingsworth and Vose Company (East Walpole, Mass.).

A problem with water-soluble paper is that it tends to swell when exposed to water. This swelling may be reduced by using a high pressure water jet, which tends to rapidly remove the paper that has been exposed to water, before the water can migrate into paper that has been partially coated with melted powder.

Alternately, if ordinary paper (that is not water-soluble) is used as the substrate, then excess paper may be removed by enzymes that digest paper. For example, in a working prototype of this invention, the enzyme complex Accellerase® 1500 from Genencor (a division of Danisco USA, Inc., Tarrytown, N.Y.) is used for that purpose. An advantage of this approach is that it lessens or avoids the swelling associated with simply dissolving some types of water-soluble paper.

This invention is not limited to the substrate materials and solvents or degrading agents listed in the table above, but may also be implemented with other substrate materials, and solvents and degrading agents.

Among other things, different substances may be applied to or incorporated in the substrate layers to modify the absorption characteristics or surface energy of the substrate. For example, the substrate's absorption characteristics may be modified in this way with respect to a variety of liquids, such as melted powder, or liquid solvent or degrading agent, or a liquid that is dispensed for the powder to adhere to. In some implementations, a sizing material that acts as a filter or a glaze may be used for this purpose. The use of Scotchguard® Fabric & Upholstery Protector (available from 3M, St. Paul, Minn.) or other repellents, mentioned above, is an example of applying a substance that changes the absorption characteristics and surface energy of the substrate layer.

Registration:

In exemplary implementations of this invention, a registration mechanism is employed to cause the layers of substrate to be aligned during the 3D printing process. For example, guide posts in a registration form may be inserted into guide holes in the substrate layers. Or, for example, a corner of each substrate layer may be pushed into a guide corner, to align the layer with other layers. Or, for example, a light sensor or camera may be employed to determine whether substrate layers are aligned. This invention is not limited to the registration techniques described above, but may employ any type of registration to align the substrate layers.

Figure 2A:
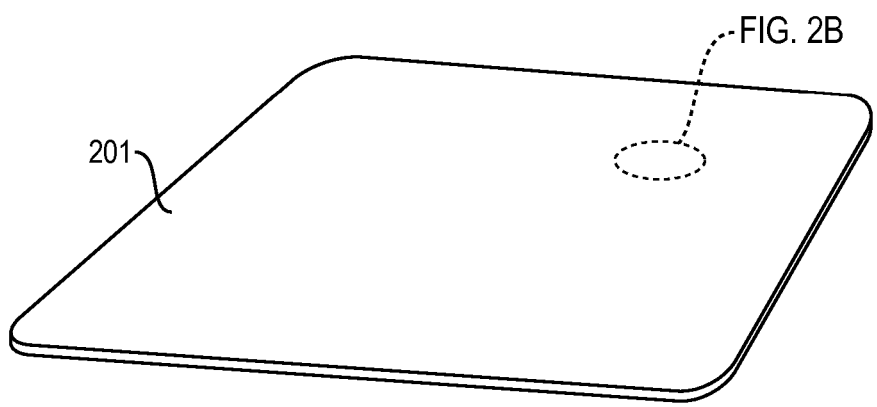
FIG. 2A shows a substrate layer.
Figure 2B:
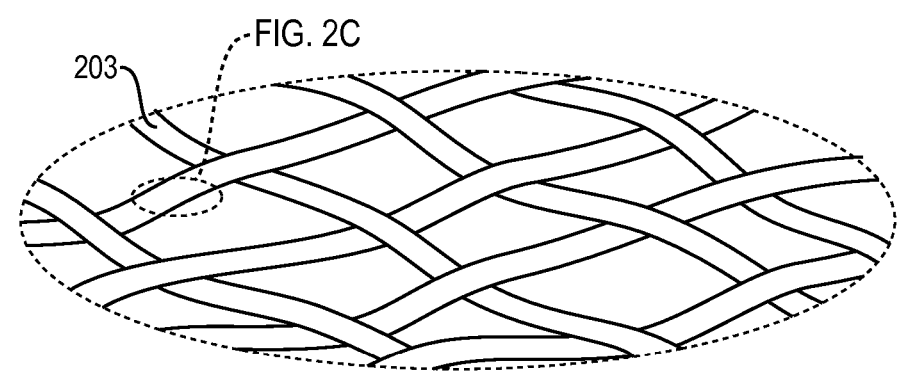
FIG. 2B is a magnified view of part of the same substrate layer, showing threads in the substrate layer.
Figure 2C:
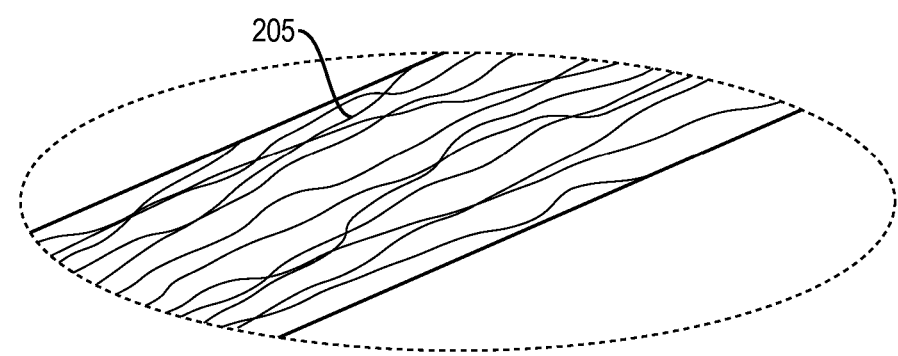
FIG. 2C is a magnified view of part of one of the threads, showing fibers in the thread.

Substrate Layers:

FIG. 2A shows a substrate layer 201, in an illustrative implementation of this invention. FIG. 2B is a magnified view of part of the same substrate layer 201, showing woven threads (e.g., thread 203) in the substrate layer. FIG. 2C is a magnified view of part of thread 203, showing fibers (e.g., 205) in thread 203. In the example shown in FIGS. 2A, 2B and 2C, the substrate is woven and fibrous. However, non-woven, fibrous substrates may be used instead. For example, the substrate may comprise a composite, nonwoven material that includes threads, short fibers, long fibers, or whiskers. Alternately, the substrate may comprise spherical particles, ellipsoidal particles, flakes, small platelets or small ribbons (or particulates of any other shape) which are joined together by a glue or other binding material.

Figure 3:
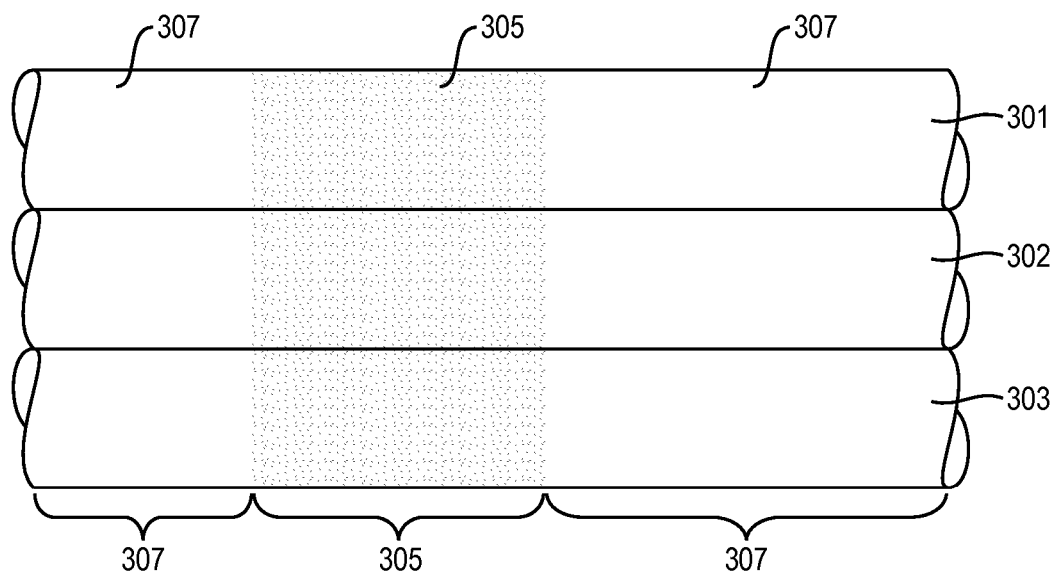
FIG. 3 is a cross-sectional view of multiple substrate layers bound together by solidified thermoplastic, after thermoplastic powder has melted, coated a portion of the substrate layers, and cooled.

FIG. 3 is a cross-sectional view of three substrate layers 301, 302, 303, after thermoplastic powder has melted, coated a portion of the substrate layers, cooled and solidified, in an illustrative embodiment of this invention. A portion 305 of these substrate layers is coated by the solidified thermoplastic. Another portion 307 of these substrate layers is not coated by the solidified thermoplastic. The details of the coating may vary, depending on the implementation. For example, the solidified thermoplastic may coat, infiltrate, penetrate or encapsulate a portion of the substrate layer, or substructures in a portion of the substrate layer (such as threads, short fibers, long fibers, whiskers, spherical particles, ellipsoidal particles, flakes, small platelets, small ribbons, particulates of any other shape). The thickness of the coating may vary, depending on the implementation. Likewise, the way in which the solidified thermoplastic connects or bridges between substrate layers may vary, depending on the implementation.

Figure 4:
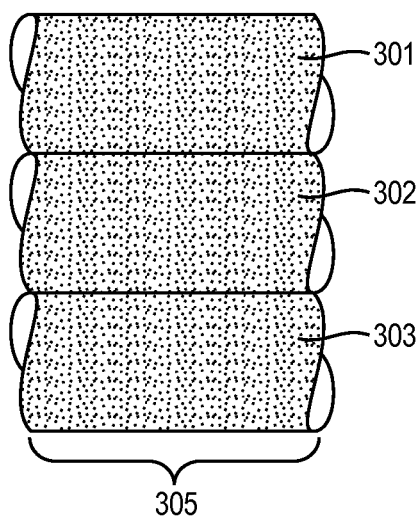
FIG. 4 is a cross-sectional view of the same multiple substrate layers, after excess substrate has been removed.

FIG. 4 is a cross-sectional view of the same three substrate layers, after excess substrate (307 in FIG. 3) has been removed. That is, it shows these three substrate layers, after removal of the portion of the substrate that is not coated by the solidified thermoplastic.

Figure 5:
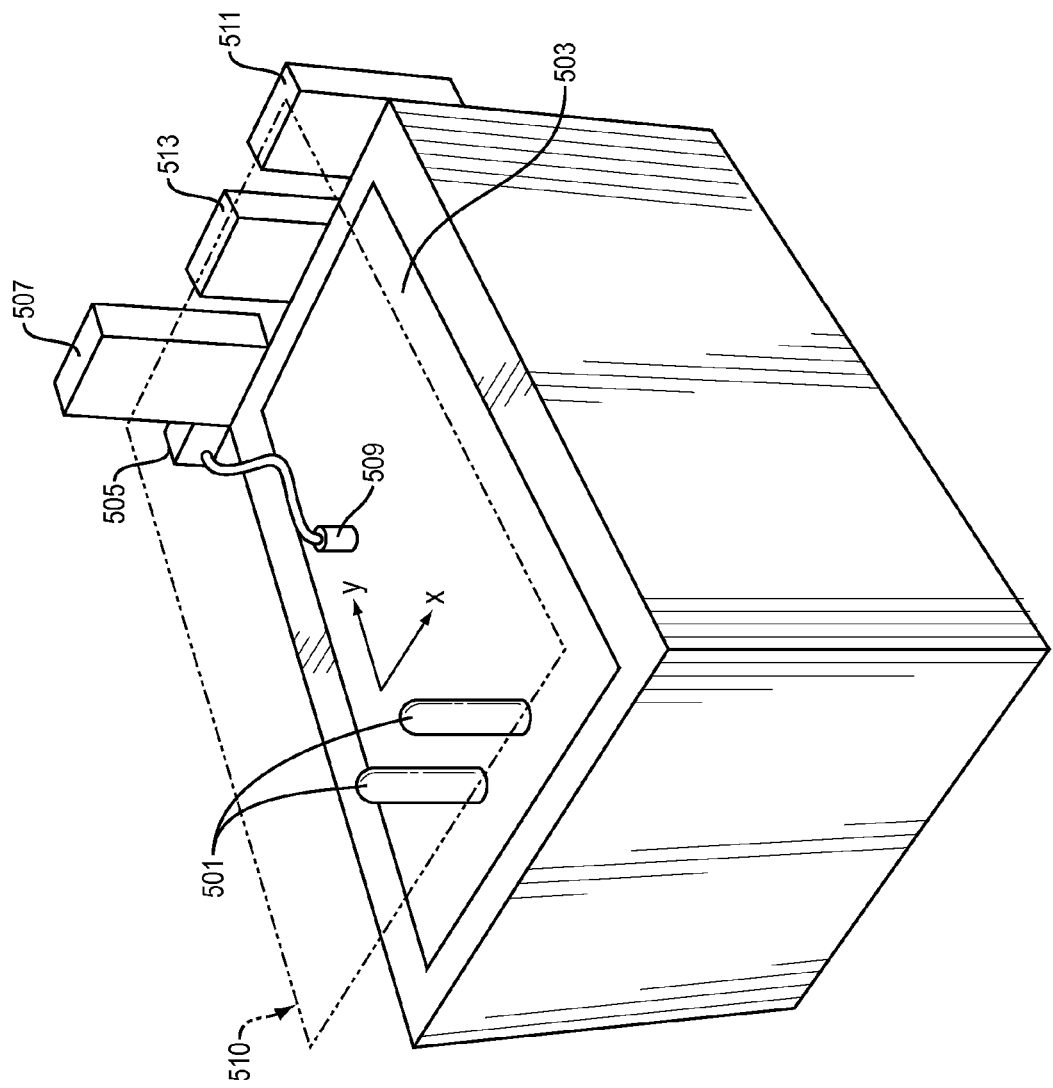
FIG. 5 shows apparatus used to selectively deposit liquid (to which powder adheres), in an illustrative implementation of this invention.

Rastering:

FIG. 5 shows apparatus used to selectively deposit liquid (to which powder adheres), in an illustrative implementation of this invention. Registration guide posts 501 are inserted through a substrate layer 503 in order to properly align the substrate layer 503. A solenoid valve 505 is used to selectively dispense liquid from a liquid reservoir 507 though a nozzle 509 unto the substrate layer 503. The nozzle 509 is rastered in a 2D plane 510 that is parallel to, and above, the substrate layer 503, so that the liquid is selectively deposited at desired x, y coordinates of the substrate layer 503, and not deposited in other areas of the substrate layer 503. To achieve this rastering, a stepper motor 511 actuates two belts (not shown) that causes a support member (not shown) to move along two rails (not shown) in a direction parallel to the x axis. A second stepper motor (not shown) and third belt (not shown) are mounted on the support member, and are used to move a nozzle support (not shown) in a direction parallel to the y axis. The nozzle 509 is attached to the nozzle support. Together, the two stepper motors can move the nozzle 509 to any desired x, y coordinate above the substrate layer. A microprocessor 513 controls the stepper motors and the solenoid valve, thereby controlling when and where liquid is dispensed on the substrate layer 503.

Alternately, rather than rastering in a line-by-line pattern, the stepper motors may cause the nozzle 205 to move in other 2D patterns in the 2D plane to cause the liquid to be deposited at certain x, y coordinates.

FIG. 5 does not show apparatus for heating and pressing multiple layers of substrate, or for removing excess substrate. In some implementations, the substrate layer is moved to a different position before those steps occur.

Processors:

In exemplary implementations, computer processors are used to control the 3D printing process.

Figure 6:
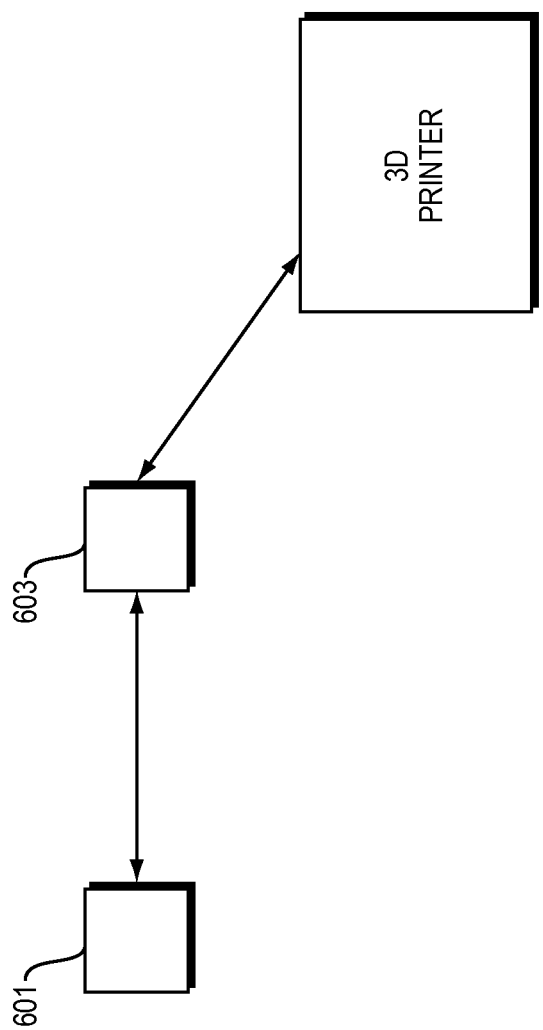
FIG. 6 is a high-level block diagram of processors, in an illustrative implementation of this invention.

FIG. 6 is a block diagram that shows a plurality of processors, in an illustrative implementation of this invention. A CAD model of a desired 3D object in STL file format is created using a remote processor 601. This processor 601 employs software (such as Netfabb® Studio software) to create a machine-specific build file. The machine-specific build file is exported to a second processor 603. Depending on the particular implementation, this second processor controls the operation, including movements, of: (1) an inkjet head or other device that selectively deposits liquid, (2) actuators that spread out the powder on the substrate and then remove the excess powder, (3) a thermal print head, (4) a hot stamp press, or (5) actuators that feed or flip over substrate layers.

Alternately, this invention may be implemented with other arrangements of processors. For example, more than one remote processor and more than one onboard processor may be employed, and any of the above tasks may be handled by one or more of these different processors.

Ink Jet Printer:

In some implementations of this invention, an ink jet printer is used to selectively deposit liquid on a substrate layer. The liquid is conventional ink used for an inkjet printer. Alternately, water or another wetting liquid may be used as the liquid. The ink jet head is rastered (or otherwise moved in a 2D pattern) across the substrate layer, using x and y stepper motors. As inkjet printer head is rastered, it can print multiple lines of ink with each pass. After the liquid is selectively deposited on the substrate layer, the layer is flooded with powder (e.g., thermoplastic powder). The powder adheres where the liquid is present. Then excess powder (that does not adhere to the liquid) is removed. A heated press is used to melt the powder and to press layers of substrate together. All of these steps—inkjet printing, application of powder and removal of excess powder, and the heated press or iron—may be automated, to improve the precision and speed of steps in the process.

This approach (with an ink jet printer and heated press) has a number of advantages. First, it may be implemented using simple, low-cost apparatus. Second, it is fast: for example, ink jet printers can achieve rates of 30 sheets per minute. Third, objects can be printed in color and decorated. For example, in a prototype of this invention, dyes or pigment-based inks can be used, allowing fully decorated parts to be made. The ink jet heads can be inexpensive. For example, disposable, inexpensive thermal inkjet heads (such as HP45 available from Hewlett Packard Company) can be used.

This ink jet approach may be scaled easily. For example, the thermoplastic may be selectively applied to large (long) sheets of substrate. Unlike laser sintering and fused deposition, there is no need for a precision oven. The surface tension and evaporation of the liquid can be modified by using a liquid other than water, or by adding other compounds (such as ethylene, propylene glycol or 2-pyrrolidinone) to the water.

Prototypes:

The following is a description of three prototypes of this invention:

Prototype #1:

In a first prototype, the substrate is comprised of polyamide (nylon) fabric. A first layer of substrate is placed on a hot stamp press. A second layer of substrate is placed on another surface (not on the hot stamp press). Water is then selectively applied to that second substrate layer. The second layer is then flooded with Shaetti® SF 400 thermoplastic powder. The powder adheres to the water that was applied to the second layer. The second layer is turned upside down, which causes the excess powder (which is not adhering to the water) to fall off. The second layer of substrate is then placed in the hot stamp press, while still upside down, with the powder adhering to the bottom of the second layer. When it is so positioned, the second layer is on top of the first layer. The hot stamp press then heats and presses the two layers together. The process is repeated by adding a third layer of substrate, fourth layer and so on, each in the same manner as the second layer. Each time that the hot stamp press does a "stamp", it melts the powder beneath the top substrate layer. The resulting molten material coats a portion of the substrate layers, then cools and solidifies, causing the then current top and second-to-top layers of substrate to adhere to each other. The portion of the substrate to which the powder adhered is coated in a solidified plastic material.

After all of the layers of substrate have been added and pressed together, the resulting object is taken off the hot stamp press. It is then placed in an aqueous solution of hydrochloric acid. The hydrochloric acid causes the excess substrate (which is not coated by the solidified material) to dissolve. In order to speed up this dissolution, the solution is heated and stirred by, for example, a magnetic stirrer. After the excess substrate is removed, what remains is the desired 3D object. This 3D object comprises solidified plastic (that resulted when the thermoplastic powder cooled) and the portion of the nylon substrate that it coats.

In this first prototype, each layer of substrate has guide holes in it. Registration guides (that are, for example, posts attached to the hot stamp press) are inserted into the guide holes of each layer of substrate, in order to make the substrate layers align with each other.

In this first prototype, Scotchguard® Fabric & Upholstery Protector (available from 3M, St. Paul, Minn.) may be sprayed onto each substrate layer before liquid is selectively deposited on the layer. This reduces the amount of liquid that is absorbed by the substrate and the distance the liquid spreads in the substrate. Alternately, or in addition, each substrate layer may be suspended over a frame, so that the center portion of the layer is not touching any solid surface. This, too, tends to reduce the absorption of liquid by the substrate, and the spreading of the liquid.

Alternately, in this first prototype, an alcohol (instead of water) may be selectively applied to the substrate layers.

Alternately, in this first prototype, the substrate layers may be aligned and placed, one on top of another, in a compressive device that is tightened to apply pressure to compress the substrate layers together. This device, once tightened, may be placed in an oven (e.g., a conventional toaster oven).

In this first prototype, the excess substrate (comprised of polyamide) is removed with hydrochloric acid.

Prototype #2:

In a second prototype, water soluble paper is selectively printed with water using a 0.005 inch minstac nozzle obtained from the Lee Company, Essex, Conn. (part INZA650935K). In this instance, the amount of water deposited at this step is not enough to substantially dissolve the paper. The nozzle is rastered in a line-by-line pattern (or otherwise moved in a 2D pattern) above the substrate layer using two stepper motors that move in x and y directions. A microcontroller controls the stepper motors. It also controls the opening and closing of the valve in the nozzle. When the valve is open, water under pressure is deposited on the substrate layer.

In this second prototype, the paper that is used has been cut on a laser cutter, with two registration holes in the top of the paper. Paper is inserted into a machine where it is aligned on a registration form, and a "slice" of the object is printed with water on the paper. The water is selectively printed in a pattern that corresponds to the particular slice. The paper is then flooded with Shaetti® SF 400 thermoplastic powder which adheres only where the water has been deposited. The paper is then turned upside down and the excess powder falls off from the areas where no water has been deposited. The piece of paper for the first layer is then set on a registration form with two registration rods, on top of a bottom sheet of paper that was previously placed in the registration form. The paper with the powder attached is placed powder side down. This paper is then tacked to the bottom sheet using a tacking iron. This process is repeated multiple times until each layer of the object has been printed. The tacking iron is used to insure that powder remains attached to the paper after the water has dried.

In this second prototype, the sandwich of paper is clamped with a C-clamp using a rubber stopper between the C-clamp and the paper sandwich so that the force is retained as the paper sandwich is compressed when it is heated. This assembly is then put in an oven above the melting temperature of the thermoplastic powder and for a period of time which is longer as the part becomes larger. This causes the thermoplastic powder to penetrate the paper and glue the sheets of paper together. The paper stack is then removed from the oven and allowed to cool for about half an hour, allowing the thermoplastic to cool and solidify. Then the stack of paper is placed in a stream of water from a faucet. The water may be hot, since elevated temperature helps in dissolution. A jet of water (e.g., water pick) may also be used to accelerate the removal of the excess paper (i.e., the paper that is not coated with plastic). The excess paper is removed, resulting in a 3D object. Objects that are produced using this prototype are stiff and have good mechanical integrity. Before the excess substrate is removed, it acts as support for the 3D object being produced, allowing for a wide range of geometries to be constructed.

In this second prototype, other methods for applying heat and pressure may be used, instead of an oven and C-clamp. For, example, a heated press (such as a hot stamping press) can be used to apply heat and pressure to each substrate layer (or to a few substrate layers at a time). With a heated press, it can be easy to control the temperature, pressure and duration of each heat/pressure step. Or, for example, the paper layers may be aligned and placed, one on top of another, in a compressive device that is tightened to apply pressure to compress the substrate layers together. The compressive device, once tightened, may be placed in an oven (e.g., a conventional toaster oven). The compressive device may include springs or other elastic components that continue to apply pressure even if the thickness of the paper layers decreases (e.g., due to compression).

Prototype #3:

In a third prototype, an inkjet printer is used. The inkjet printer selectively deposits liquid on a substrate layer (so that the liquid is on some parts of the substrate layer and not on other parts of the substrate layer). In other words, the inkjet printer prints a pattern of liquid on the substrate layer. The substrate layer is then flooded with thermoplastic powder. The powder adheres to the substrate in accordance with the printed pattern (i.e., the powder adheres to the portion of the substrate layer where the liquid has been deposited, but does not adhere to the rest of the substrate layer).

Thus, an overall effect of the above steps in this third prototype is that the thermoplastic powder is selectively deposited on the substrate layer in a pattern, where the pattern corresponds to the pattern of liquid printed by an inkjet printer.

Here is more detail about this third prototype.

A rectangular layer of substrate is taped to an 8.5 inch by 11 inch sheet of conventional paper. When doing so, the outer edges of the substrate layer are aligned with a rectangle printed on the sheet of paper Then an HP 820CSE inkjet printer (manufactured by Hewlett Packard Company, Palo Alto, Calif.) prints a pattern of ink on the substrate layer. Conventional ink for that printer is used. The printed pattern comprises a grid that defines a matrix of tiles. In this printed pattern, a different cross-sectional "slice" of a three-dimensional object is printed in each of the tiles, respectively.

In this third prototype, different types of substrate material (and, correspondingly, different ways to remove excess substrate) may be employed. For example, the substrate may comprise PVOH. In that case, water may be used to dissolve the excess substrate. Or, for example, the substrate may comprise PLA. In that case, excess substrate may be removed by placing the rectangular cuboid in a solution of methanol and KOH. In order to speed the removal, this solution may be agitated with a magnetic stirrer, or may be placed in an ultrasonic tank.

Figure 7:
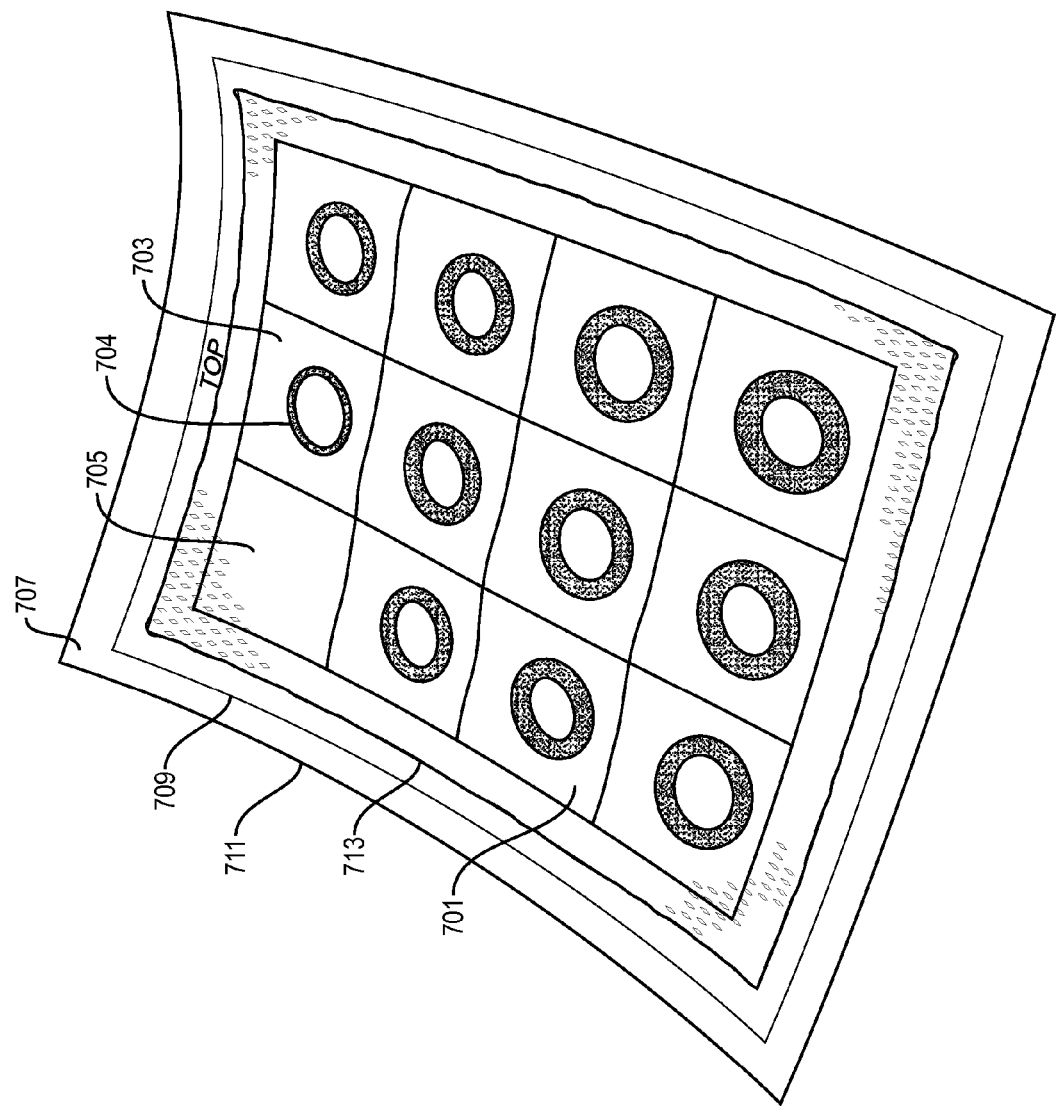
FIGS. 7 to 11 illustrate a prototype of this invention. In the example shown in FIGS. 7 to 11, a ring torus is being fabricated.

FIG. 7 shows a pattern that has been inkjet-printed on a substrate layer 701. The pattern comprises a grid that defines a 4×3 matrix of tiles. In each tile, respectively (e.g., 703), a different cross-sectional "slice" (e.g., 704) of a ring torus has been printed by the inkjet printer. (The upper left tile 705 in FIG. 7 is a null slice of the ring torus, i.e., it does not include a part of the ring torus).

FIG. 7 shows how the substrate layer is aligned with a sheet of paper 707. On the sheet of paper 707, rectangles have been pre-printed. The substrate layer is taped on the paper so that the outer edges of the substrate layer align with one of these pre-printed rectangles on the sheet of paper. More specifically, in FIG. 7, three rectangles, nestled inside each other, have been pre-printed on the paper. The outer rectangle 711 and central rectangle 709 of these three rectangles are visible in FIG. 7. The innermost of these three pre-printed rectangles on the sheet of paper is not visible in FIG. 7. However, innermost rectangle is aligned with, and lies directly beneath, the outer edge 713 of the rectangular grid (visible in FIG. 7) that was printed on the substrate layer by the inkjet printer.

After the inkjet printer prints the pattern on the substrate layer, the substrate layer is flooded with thermoplastic powder (e.g. Schaetti® Fix 400 powder). The excess powder is then removed, by turning the paper upside down and tapping the paper with a finger. Other removal methods may be used, such as vacuuming or blowing the excess powder away.

The substrate layer is then aligned on a laser cutter. The laser cutter then cuts lines that separate the substrate layer into the tiles and cuts two registration holes in each of the tiles.

In this example, each substrate layer is divided into 12 tiles, with a different "slice" of a ring torus printed on each tile, respectively. These tiles are placed in a device for applying pressure (a "compressive device"), one tile on top of another. The compressive device includes one or more elastic components (e.g., springs) to maintain pressure on the substrate layers even if they compress. The tiles are aligned by inserting two guide holes in each tile, respectively, through two guide posts in the press.

Figure 8:
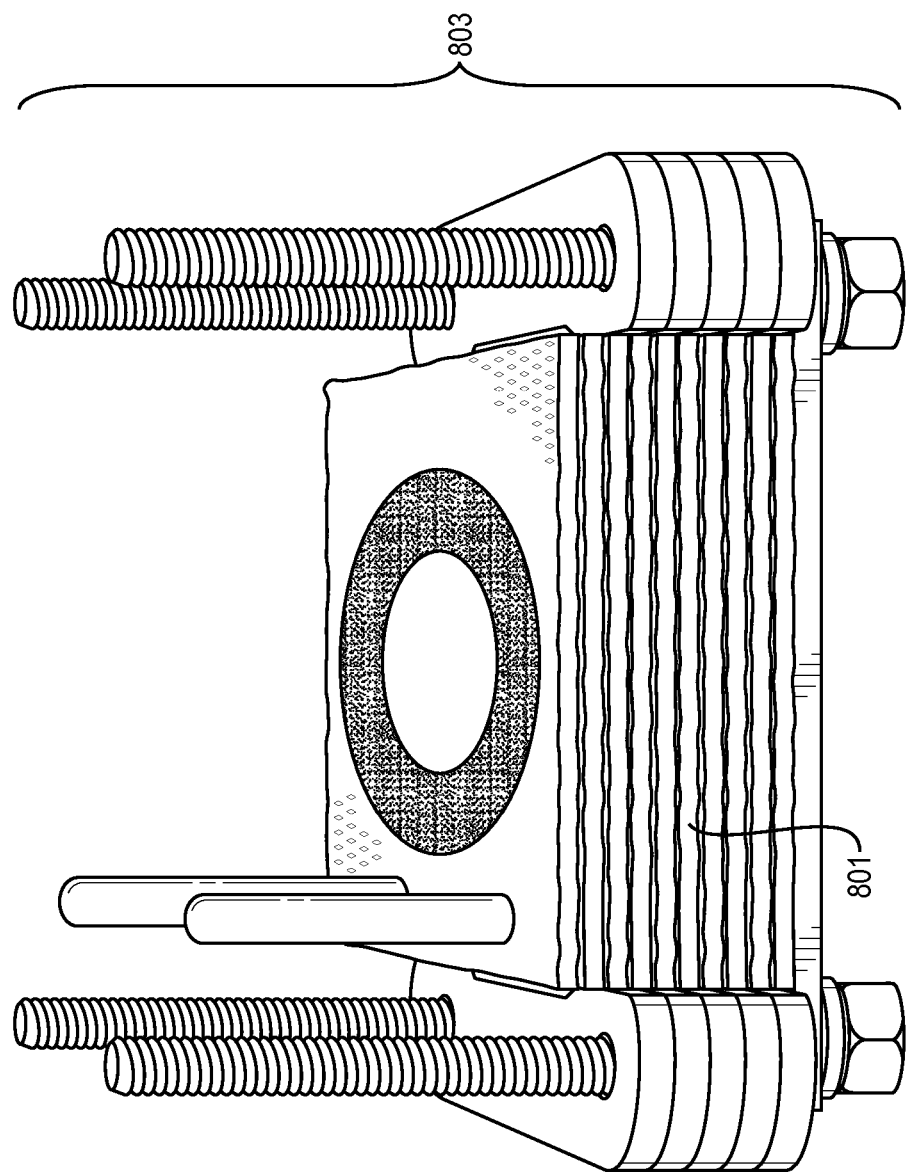

FIG. 8 shows a compressive device 803, after a number of substrate tiles (layers) (e.g., 801) have been placed in it, one on top of the other.

If more than 12 tiles are needed, then the process is repeated, until enough substrate tiles (layers) have been produced.

In this example, substrate tiles for all of the "slices" of the ring torus are placed into the compressive device. The total number of substrate tiles is more than 12. (The process of printing 12 slices on 12 tiles on a substrate layer is repeated, layer by layer, until tiles for all of the slices have been printed). Each of the tiles is itself a substrate layer, and is cut from a larger layer of sheet of substrate. The substrate layers (tiles) that have been inserted into the compressive device are then compressed together by that device.

Figure 9:
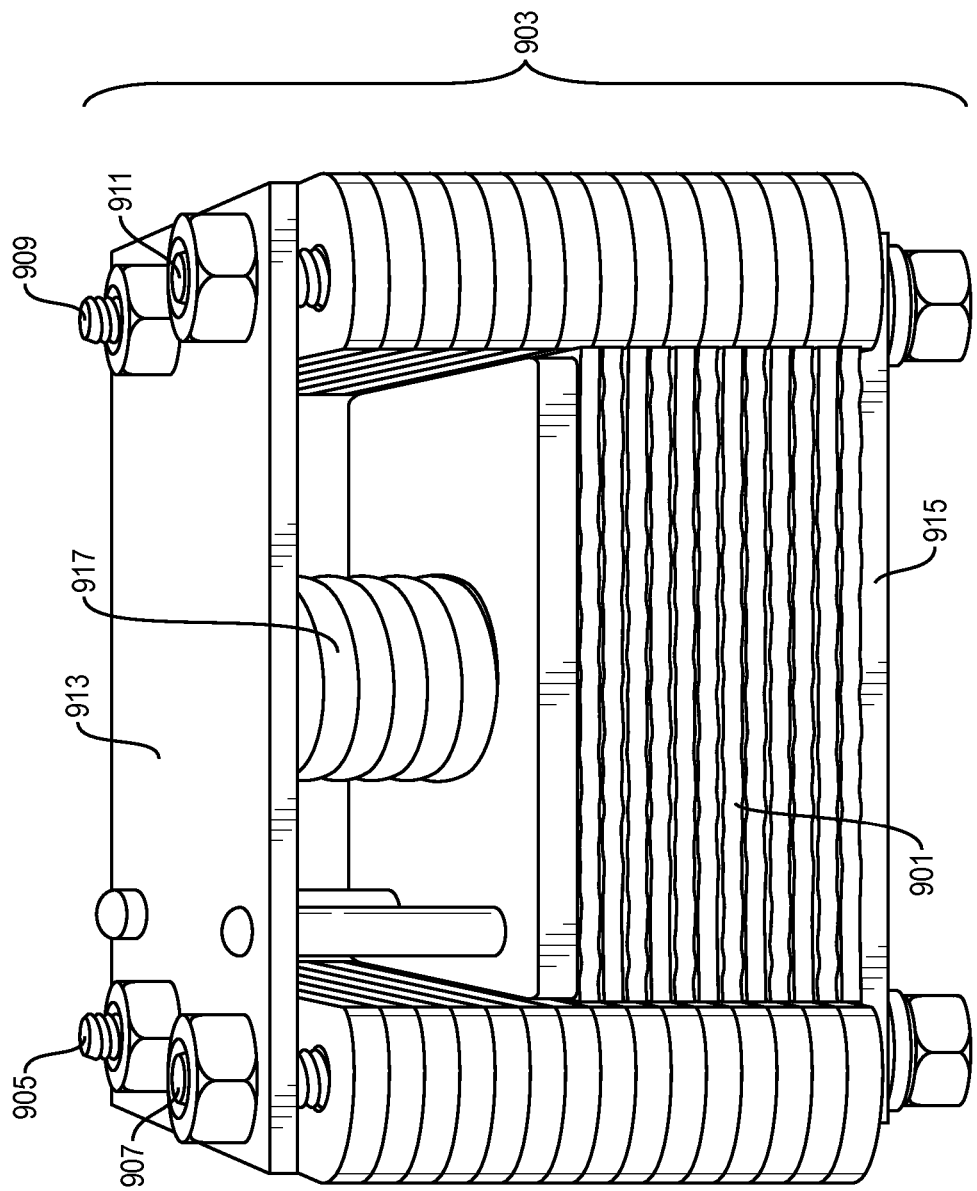

FIG. 9 shows substrate layers being compressed in the compressive device 903. Screws 905, 907, 909, 911, plates 913, 915 and a spring 917 in the compressive device are used to exert pressure.

Once tightened, the compressive device (with the substrate layers in it) is then placed in a conventional toaster oven. The compressive device includes both a spring (to maintain pressure on the substrate layers even if they compress) and (2) a stand-off, clutch, brake or damper to limit movement of the compressive device. Alternately, the springs in the compressive device may be omitted and simple mechanical pressure of the screws can be used. Alternately, a hot stamping press can be used to apply pressure.

The heat from the oven causes the thermoplastic powder to melt. The molten material coats the substrate layers. The compressive device (with the substrate layers in it) is then removed from the oven, and the substrate layers are allowed to cool. The molten material then solidifies. As it does so, it binds (fuses) substrate layers together.

Figure 10:
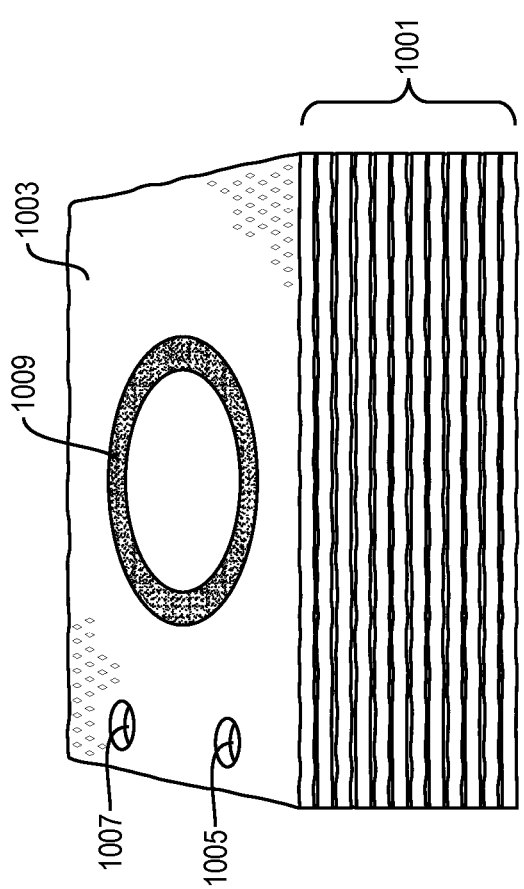

FIG. 10 shows the substrate layers 1001, after they have been fused together (as described in the preceding paragraph) into a rectangular cuboid 1003. In this example, a 3D toroid is being fabricated, and the upper-most slice 1009 of the toroid is visible at the top surface of the cuboid 1003. Two registration holes 1007 and 1009 are visible in excess substrate that will be subsequently removed.

Figure 11:
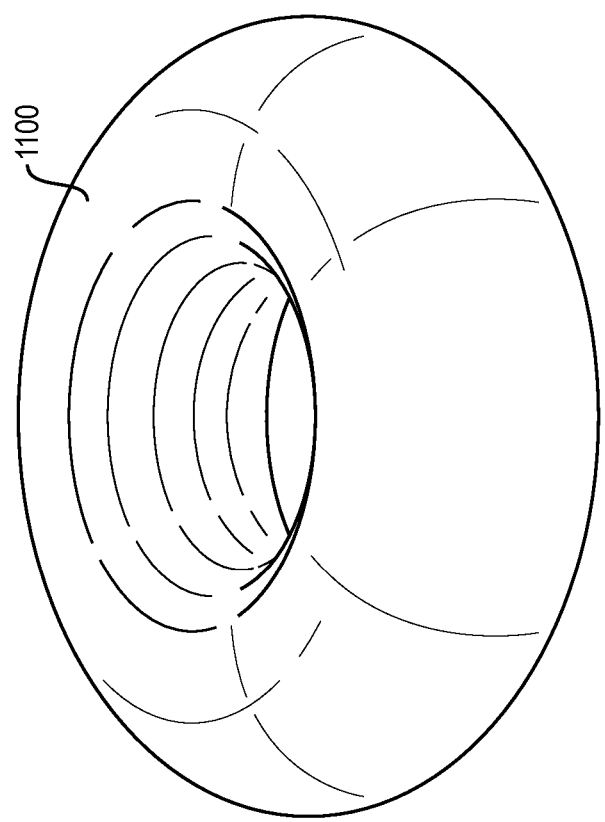

Excess substrate (that has not been covered by the solidified material) is then removed. In the example shown in FIG. 11, a ring torus 1100 remains after excess substrate in a rectangular cuboid has been removed.

Many Ways of Implementing Invention:

This invention is not limited to melting of the powder, in which solid powder becomes liquid. Other transitions may be employed. For example, the powder may undergo a glass transition that allows it to penetrate the substrate. Or, for example, the powder may be transformed into in a bi-phasic material that can penetrate the substrate.

This invention is not limited to fibrous substrates. For example, the substrate may be a composite that comprises particles, ellipsoidal particles, flakes, small platelets, small ribbons, or particulates of any other shape (or a combination of two or more of these) which are bound or glued together by another material.

Figure 12A:
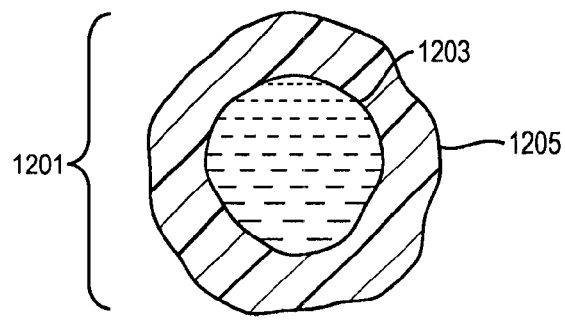
FIG. 12A shows a grain of powder that microencapsulates a liquid.

This invention may be implemented using grains of powder that each encapsulate (or microencapsulate) a resin or other liquid. In the example shown in FIG. 12A, a powder grain 1201 comprises a solid outer layer 1205 of thermoplastic or thermoset plastic. The outer layer 1205 encapsulates liquid 1203. The powder may be selectively deposited. Pressure (and heat) may be applied burst the encapsulation. The resin or liquid may then infiltrate into the substrate layers. The resin may harden upon exposure to (1) air, (2) a reactant, reagent, catalyst or solvent, or (3) electromagnetic radiation.

Figure 12B:
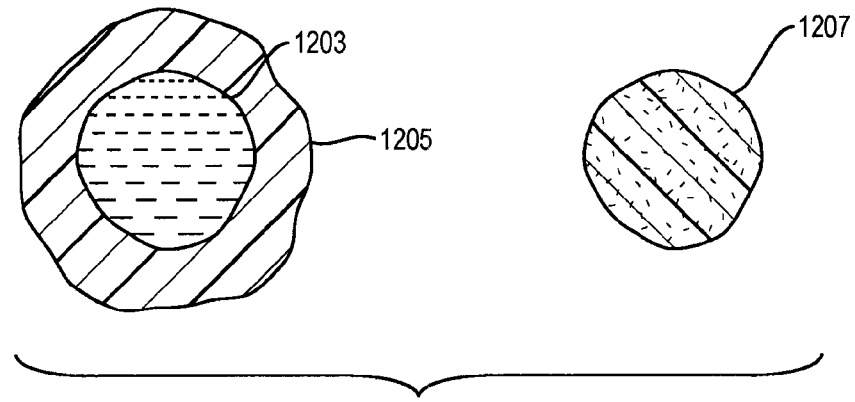
FIG. 12B shows a powder mixture that comprises two types of grains: first, a completely solid grain; and second, a grain that comprises a solid outer layer that encapsulates a liquid.

In an illustrative embodiment of this invention, grains of powder encapsulate (or microencapsulate) epoxy resin. Grains of epoxy hardener are also mixed into the powder. The powder mixture is selectively deposited. Pressure (and heat) may be applied burst the encapsulation, so that the resin penetrates into the substrate layers and then hardens. In the example shown in FIG. 12B, the powder mixture comprises two types of grains: first, completely solid grains of epoxy hardener 1207; and second, grains that comprise a solid outer layer 1205 that encapsulates a liquid epoxy resin 1203.

Alternately, the substrate may be flooded with powder that encapsulates liquid. Pressure may be selectively applied (e.g., with a dot matrix print head) to burst the encapsulation, so that the liquid infiltrates the substrate layers and then hardens.

Figure 13:
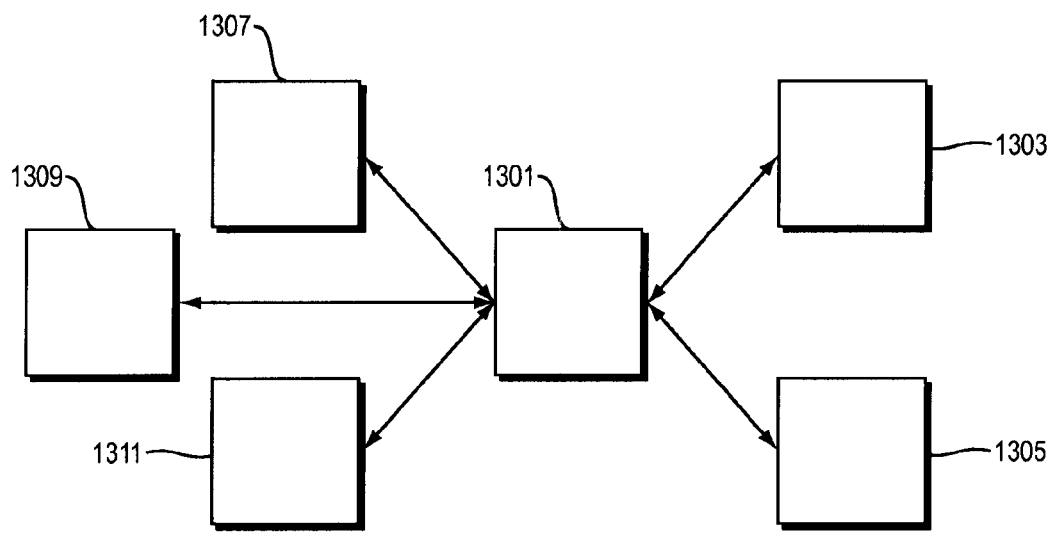
FIG. 13 is a block diagram that shows a processor that controls multiple components of an apparatus for fabricating a 3D object.

In exemplary implementations of this invention, a variety of means may be used to transform powder into a substance that flows and then subsequently hardens. For example, the means may comprise a heating element. The heating element may comprise any artificial heat source that heats by one or more of conduction, convection or radiation. For example, the heating element may comprise: (1) a resistor or any other resistive heating element; (2) any other device that converts electricity into heat by ohmic heating; (3) a hot stamp press or any other apparatus for applying heat and pressure; (4) an oven; or (5) an artificial source of electromagnetic radiation, including a heat lamp, an artificial infrared light source, a laser; or an artificial source of microwave radiation. Also, for example, the means may comprise an artificial pressure source, including a press, clamp, iron, roller, pump, piston, or elastic element (e.g. spring) for applying pressure. The pressure may be used, for example, to compress layers together or to squeeze the flowing substance into interstices in the substrate layers. Or, for example, the pressure may be used to crush, rupture or burst grains of powder that encapsulate liquid. The liquid may then flow, and may harden or cause something else to harden. The heating element or pressure source may be configured to transform powder into a substance that flows and then subsequently hardens. Also, for example, the means may comprise a reagent, reactant, catalyst, solvent or solute used in a chemical reaction. The reaction may soften or harden all or a portion of the powder. An applicator may be configured to apply, deposit or deliver the reagent, reactant, catalyst, solvent or solute to the powder. Also, for example, the means may comprise an artificial source of electromagnetic radiation. The radiation may, for example, be used for hardening the powder, including by curing. The radiation source may be configured to transform powder into a substance that flows and then subsequently hardens FIG. 13 is a high-level block diagram of some hardware that may be used in this invention. One or more processors 1301 control an applicator 1303, a heating element 1305, an actuator 1307, an artificial pressure source 1309, and a stirrer in a container of liquid 1311. The applicator 1303 deposits powder in positive regions, but not in negative regions, of substrate layers. The heating element 1305 transforms the powder into matter that flows and then hardens. The resulting hardened material is disposed in a spatial pattern that infiltrates the substrate layers. The artificial pressure source 1309 may comprise a press, clamp, spring, elastic element, or other device for compressing the substrate layers. The stirrer may be used to stir a liquid that is used for removing excess substrate.

Figure 14A:
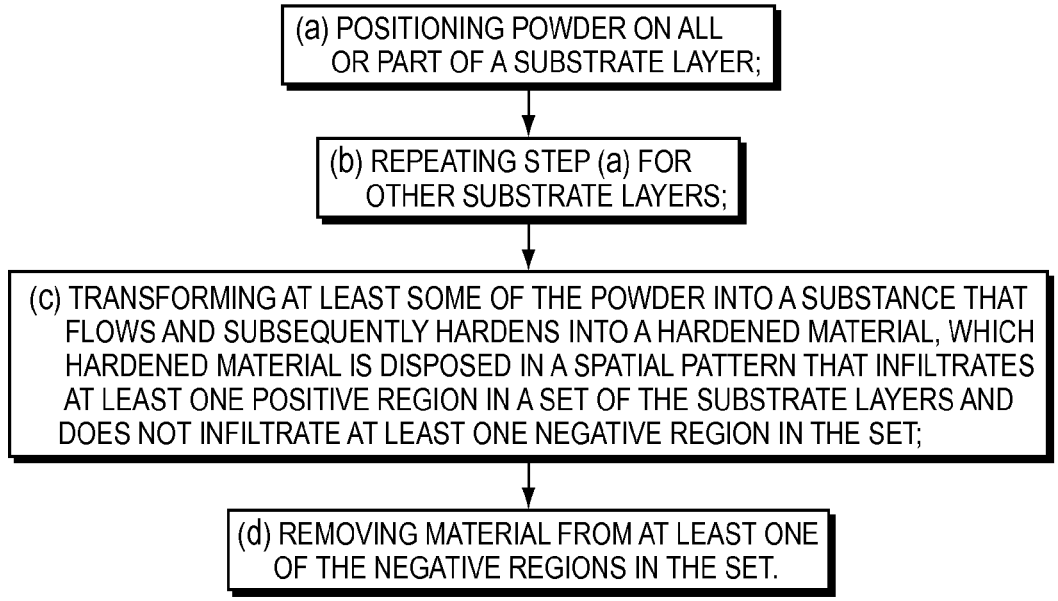
FIG. 14A is a high level flow chart of steps in an exemplary implementation of this invention.
Figure 14B:
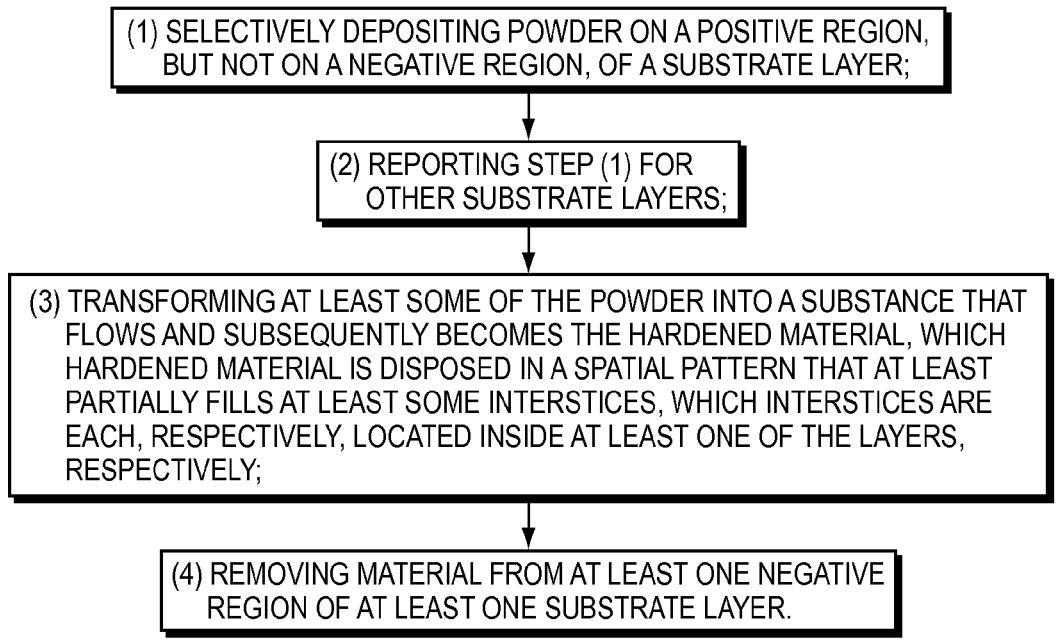
FIG. 14B is a high level flow chart of steps in another exemplary implementation of this invention.

FIGS. 14A and 14B are each flow charts of steps used to fabricate a 3D object, in two different illustrative embodiments of this invention, respectively.

In some implementations of this invention, the melted or softened powder may enter the substrate layers by absorption.

In another aspect, this invention may comprise an article of manufacture. Advantageously, in some implementations, using powder permits the finished 3D product to have a high resolution in at least one dimension. Consider the following example: powder is selectively deposited on substrate layers. For each layer, two substeps occur: first, an inkjet head is used to dispense liquid, and second, powder is applied and adheres to the liquid. The powder is then heated and flows, infiltrating the layers, and cooling into a solidified material that binds the substrate layers together. In this example, the spatial resolution of an exterior surface of the 3D product may be approximately equal to the resolution of the inkjet head in an x, y direction and to the thickness of a substrate layer in the z direction.

In an illustrative implementation, an article of manufacture may comprise substrate layers infiltrated by a hardened material. The hardened material may be a thermoplastic. For example, an exterior surface of the hardened thermoplastic may have a spatial resolution of 60 or more dots per centimeter in at least one dimension, and the thermoplastic may have a viscosity of 50 or more centipoise at 50 degrees centigrade above the thermoplastic's melting temperature. Or, for example, an exterior surface of the hardened thermoplastic may have a spatial resolution of 170 or less microns in at least one dimension, and the thermoplastic may have a melt flow rate of at least 70 grams/10 minutes.

This invention may be implemented in many different ways. Here are some examples:

This invention may be implemented as a method of fabricating a 3D object, which 3D object comprises a plurality of substrate layers that are infiltrated by and bound together by a hardened material, the method comprising the following steps, in combination: (a) positioning powder on all or part of at least one of the layers; (b) repeating step (a) for remaining layers in the plurality of substrate layers; and (c) transforming at least some of the powder into a substance that flows and subsequently hardens into the hardened material, which hardened material is disposed in a spatial pattern that infiltrates at least one positive region in a set of the substrate layers and does not infiltrate at least one negative region in the set; wherein the powder is transformed in step (c) after being positioned in either step (a) or step (b), and wherein the substrate layers have at least one material property that is different than any material property of the hardened material. Furthermore: (1) the positioning may comprise selectively applying the powder to part but not all of a surface of the layer; (2) the positioning may be in accordance with a machine-readable digital model of a slice of the 3D object; (3) the transforming may comprise melting at least part of the powder; (4) the powder may comprise grains that each, respectively encapsulate a liquid, and the transforming may comprise rupturing, bursting or crushing at least some of the grains; and (5) the transforming may comprise a chemical reaction.

This invention may be implemented as a method of fabricating a 3D object, which 3D object comprises a plurality of layers and a hardened substance that binds the layers together, the method comprising the following steps, in combination: (a) selectively depositing powder on a positive region, but not on at least part of a negative region, of one of the layers; (b) repeating step (a) for remaining layers in the plurality of layers; (c) transforming at least some of the powder into matter that flows and subsequently becomes the hardened substance, which hardened substance is disposed in a spatial pattern that infiltrates the layers; and (d) removing material from at least one negative region of at least one substrate layer; wherein the powder is transformed in step (c) after being deposited in either step (a) or step (b), and wherein the substrate layers have at least one material property that is different than any material property of the hardened substance. Furthermore: (1) the selectively depositing powder on a positive region of the one of the layers may comprise a first substep and a second substep, the first substep comprising selectively depositing liquid on the positive region, and the second substep comprising positioning the powder on or adjacent to the one of the layers to adhere the powder to the liquid; (3) the selectively depositing may further comprise a third substep, which third substep comprises removing powder that does not adhere to the liquid; and (4) the layers may comprise PET or PLA and an alkali, alone or together with one or more other substances, may be used for the removing This invention may be implemented as apparatus for fabricating a 3D object, which object comprises a plurality of layers and a hardened substance, the apparatus comprising, in combination: (a) an applicator, the applicator being configured for selectively depositing powder in at least some positive regions, but not in at least some negative regions, of at least some of the layers; and (b) a heating element, the heating element being configured for transforming the powder into matter that flows and then hardens into the hardened substance, which hardened substance binds the layers together and is disposed in a spatial pattern that infiltrates the layers; wherein the substrate layers have at least one material property that is different than any material property of the hardened substance. Furthermore: (1) the apparatus may further comprise an artificial pressure source, the pressure source being configured for applying pressure to one or more of the layers; (2) the pressure may be applied during softening of the powder; (3) the apparatus may further comprise one or more actuators, the one or more actuators being configured for translating one or more of the powder and the layers; (4) the apparatus may further comprise an additional actuator, the additional actuator being configured for translating the applicator into different positions while the applicator selectively deposits the powder; (5) the apparatus may further comprise a processor, the processor being configured for outputting control signals to control the applicator and heating element; (6) the processor may be adapted to output control signals to control the selectively depositing of powder for each of the at least some substrate layers, respectively, in accordance with digital data that specifies different slices, respectively, of the 3D object; and (7) the apparatus may further comprise a container, the container being configured for containing a liquid, which liquid includes a solvent or degrading material that is used for removing material from the at least some negative regions.

This invention may comprise apparatus for fabricating a 3D object, which object comprises a stack of substrate layers that have been infiltrated by a hardened material, the apparatus comprising, in combination: (a) an applicator, the applicator being configured for positioning powder on the layers; and (b) means for transforming the powder into a substance that flows and then hardens into the hardened material, which hardened material binds the layers together and is disposed in a spatial pattern that infiltrates at least one positive region in a set of the layers and does not infiltrate at least one negative region in the set; wherein the substrate layers have at least one material property that is different than any material property of the hardened substance.

This invention may comprise an article of manufacture comprising a plurality of layers that are infiltrated by and bound together by a hardened material, wherein the hardened material comprises either a thermoplastic or thermosettable plastic and exhibits a set of one or more characteristics, which set is sufficient for distinguishing the hardened material as having formed as a result of powder positioned on the layers, respectively, at least partially softening and then hardening. Furthermore: (1) the set of characteristics may comprise a pattern resulting from at least some grains of powder not completely softening; (2) the set of characteristics may comprise a pattern resulting from a first grain of powder flowing, after at least partially softening, more viscously than another grain of powder flows, after at least partially melting, or from part of the first grain flowing more viscously, after at least partially softening, than another part of the first grain flows, after partially softening; (3) the set of characteristics may comprise a crystalline or amorphous structure resulting from incomplete or nonhomogeneous melting of grains of powder; (4) the substrate layers may be woven; (5) the substrate layers may be woven and fibrous; (7) the substrate layers may be non-woven; and (8) the article may include more than one hardened material, each of which has a different shade or color.

This invention may be implemented as an article of manufacture comprising a stack of substrate layers that are infiltrated by a hardened material, wherein an exterior surface of the hardened material has a spatial resolution of 60 or more dots per centimeter in at least one dimension, and wherein the hardened material comprises a thermoplastic, which thermoplastic has an viscosity of 50 or more centipoise at 50 degrees centigrade above the thermoplastic's melting temperature.

This invention may be implemented as an article of manufacture comprising a plurality of substrate layers that are infiltrated by and bound together by a hardened material, wherein an exterior surface of the hardened material has a spatial resolution of 170 or less microns in at least one dimension, and wherein the hardened material comprises a thermoplastic, which thermoplastic has a melt flow rate of at least 70 grams/10 minutes.

This invention may be implemented as a process for fabricating a 3D object, which process comprises, in combination: (a) depositing thermosettable or thermoplastic powder on a second layer of substrate, in a pattern, for each substrate layer, respectively, defined by a digital description of a slice or section of a 3D object, (b) positioning the second layer of the substrate adjacent to a first layer of substrate so that edges of the first and second substrate layers are aligned and so that powder that was deposited on the second layer is between the first and second layers, (c) repeating step a with respect to a third layer of substrate, (d) positioning the third layer substrate adjacent to the second layer so that edges of the second and third layers are aligned and so that powder that was deposited on the third layer is between the second and third layers, (e) repeating steps (c) and (d), layer by layer, until powder has been selectively deposited on substrate layers corresponding to all of the layers of the 3D object, (f) applying sufficient heat and pressure to at least two of these substrate layers to (1) cause at least a portion of the deposited powder to melt or soften, and (2) cause that melted or softened powder to coat at least a portion of the substrate layers, (g) allowing the melted or softened powder to cool, so that, upon cooling, the resulting thermoplastic or thermoset material binds together at least two substrate layers, which two layers are adjacent to each other, and (h) removing a portion of the substrate layers, which portion is not coated by the resulting thermoplastic or thermoset material. Depending on the particular implementation of this process, each of steps (f), (g) and (h) may occur either once, or more than once, during the process. For example, steps (f), (g) and (h) may occur once per layer, or once every five layers.

This invention may be implemented as a product produced by the process described in the immediately preceding paragraph.

This invention may be implemented as an article of manufacture, comprising at least twenty layers of substrate, each layer being bound to at least one adjacent layer by (and at least partially coated by) a material that comprises a thermoplastic or thermosettable polymer. Furthermore, depending on the particular embodiment of this article of manufacture: (1) the substrate layer may be woven, (2) the substrate layer may be woven and fibrous, (3) the substrate layer may be non-woven, (4) the substrate layer may be non-fibrous, (5) at least a portion of the external, macroscopic geometry of the substrate may be polyhedral in shape, (6) the macroscopic exterior of the article of manufacture may include multiple rectilinear faces in different planes, (7) the macroscopic exterior of the article of manufacture may define multiple compound or complex curves, (8) substrate layers of such article may be coated at least in part with a repellant or sizing, (9) different portions of the polymer may have different colors, and (10) the polymer may cover fibers in substrate layers. Each layer can be planar or flat.

This invention may be implemented as apparatus comprising, in combination: (a) at least one applicator for depositing thermoplastic or thermosettable powder on multiple layers of substrate, in a pattern, for each substrate layer, respectively, defined by a digital description of a slice or section of a 3D object, (b) at least one heat source for applying heat to the substrate layers, (c) at least one pressure source for applying pressure to the substrate layers, and (d) one or more computer processors for (I) accepting and processing digital data describing a section or slice of a 3d object, and (II) outputting control signals for controlling the operation of the applicators. The apparatus may further comprise one or more of the following: (1) a container for containing a liquid, which liquid includes a solvent or degrading material that is used for removing excess substrate, the excess substrate being that portion of the substrate that is not coated by thermoplastic or thermoset material after it melts or softens and then cools, (2) a heat source for heating the liquid solvent or degrading material, and (3) one or more actuators for translating one or more of the powder, substrate sheets and the finished or partially finished 3D object. Also, depending on the particular embodiment of this article of manufacture, the one or more computer processors may do one or more of the following: (1) accept and process data from one or more sensors, such as heat or pressure sensors, or sensors for determining whether and to what extent adjacent substrate layers are aligned, (2) control the at least one heat source, (3) control the at least one pressure source, (4) control the one or more actuators, and (5) accept data indicative of input from a human user.

In another aspect, this invention comprises a 3D object fabricated using any of the fabrication techniques described above. For example, such a 3D object may be comprised of composite materials. These composite materials may comprise substrate layers coated by solidified thermoplastic or thermoset polymer.

Definitions and Clarifications

Here are some definitions and clarifications. As used herein:

The terms "a" and "an", when modifying a noun, do not imply that only one of the noun exists.

An "applicator" means a device for applying a substance to a surface, or otherwise depositing, dispensing or moving the substance. For example, the substance may be a powder or a liquid. For example, an applicator may comprise an inkjet head.

The word "coat" means to (at least partially) coat, infiltrate, penetrate or encapsulate. Grammatical variations of "coat" shall be construed accordingly. To coat a substrate means to coat the substrate or substructures of the substrate (such as threads, short fibers, long fibers, whiskers, spherical particles, ellipsoidal particles, flakes, small platelets, small ribbons, particulates of any other shape).

The term "comprise" means include without limitation. If A "comprises" X and Y, this does not mean that A consists solely of X and Y. Instead, it means that A consists of at least X and Y.

The phrase "harden into" does not imply or exclude any displacement, translation or other movement.

A "heating element" means an artificial heat source that heats by one or more of conduction, convection, radiation or induction. A "heating element" includes, among other things: (1) a resistor or any other resistive heating element; (2) any other device that converts electricity into heat by ohmic heating; (3) a hot stamp press or any other apparatus for applying heat and pressure; (4) an oven; (5) an inductive heater; and (6) an artificial source of electromagnetic radiation, including a heat lamp, an artificial infrared light source, a laser, or an artificial source of microwave radiation.

The fact that an "example" or multiple examples of something are given does not imply that they are the only instances of that thing. An example (or a group of examples) is merely a non-exhaustive and non-limiting illustration.

The terms "include", "includes", "including" shall be construed broadly, as if followed by the words "without limitation".

To "infiltrate" a layer includes (a) to infiltrate or penetrate into the interior of the layer and to at least partially cover at least some interior substructures of the layer (or of the region); (b) to be absorbed into the layer, or (c) to be arranged in a pattern that results from infiltrating as described in (a) or (b). For example, a spatial pattern "infiltrates" a layer if the pattern results from infiltrating as described in (a) or (b). Also, for example, a hardened material "infiltrates" a layer if the hardened material is arranged in a pattern that results from infiltrating as described in (a) or (b). To infiltrate a region of a layer shall be construed in like manner as to infiltrate a layer. Unless the context requires otherwise, if a substance x "infiltrates" substance y, this implies that x has at least one material property that is different than any material property of y.

To "melt" includes (1) to melt or soften by the application of heat and (2) to dissolve.

A "negative" region of a substrate layer, which layer is used in fabricating a 3D object, means a region that is not (or will not be) included in the 3D object when fabrication of the 3D object is complete.

The term "or" is an inclusive disjunctive. For example "A or B" is true if A is true, or B is true, or both A or B are true.

A "positive" region of a substrate layer, which layer is used in fabricating a 3D object, means a region that is (or will be) included in the 3D object when fabrication of the 3D object is complete.

The term "powder" includes (1) a material comprising entirely solid grains, (2) a material comprising at least some grains that each, respectively, encapsulate a liquid, (3) any granular material, and (4) a material comprising solid particles that may flow, relative to each other, when accelerated.

A "set" consists of one or more elements. The term "set" does not include an empty set with no elements.

To "soften" includes (1) to soften below a melting temperature and above a glass transition temperature, (2) to melt above a melting temperature, (3) to transition from a higher to a lower elastic modulus, (4) to transition from a higher to a lower viscosity, or (5) to otherwise soften. The adjective "soft" shall also be construed in like manner. For example, the adjectives "soft" and "softened" each include "melted".

A list of multiple steps in a process does not imply, except to the extent that the context requires otherwise, that: (1) the steps occur in any particular order or sequence, including the order or sequence listed; (2) the steps occur only once; (3) the different steps occur the same number of times during the process, or (4) a particular step is applied to the same thing each time that the particular step occurs (for example, except to the extent that the context requires otherwise, a specific step that is described as applying to "a layer" may apply to a different layer each time that this specific step occurs). For purposes of this grammatical paragraph, "list" includes "description" or "describe".

"3D" Means Three-Dimensional.

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the noun "infiltration" shall be construed in like manner as the defined verb "infiltrate". Or, for example, the adjective "softened" shall be construed in like manner as the defined verb "soften".

CONCLUSION

The methods and apparatus that are described above are merely illustrative applications of the principles of the invention. Numerous modifications may be made by those skilled in the art without departing from the scope of the invention.

What is claimed:

1. An apparatus for fabricating a three-dimensional (3D) object, comprising:
   a mechanism for selectively depositing an adhering agent in a desired pattern onto portions of sheet-like substrate material, wherein a layer of said sheet-like material corresponds to a layer of the three-dimensional (3D) object;
   at least one applicator configured for applying powder onto the sheet-like substrate material;
   a removal mechanism to remove loose powder; and
   an artificial pressure source, the pressure source being configured for applying pressure to one or more of the layers;
   wherein the pressure is applied during softening of the powder.

2. The apparatus of claim 1, further comprising a processor, wherein the processor is adapted to output control signals to control the selectively depositing of the adhering agent, the applying of powder, and the removal of the loose powder, for each of the at least some substrate layers, respectively, in accordance with digital data that specifies different slices, respectively, of the 3D object.

3. The apparatus of claim 1, further comprising a subtractive apparatus configured for removing at least some regions of the substrate layers where the adhering agent has not been deposited from the substrate layers.

4. The apparatus of claim 3, wherein the subtractive apparatus removes excess substrate by one or more of dissolution, polymer degradation, mechanical abrasion, or melting.

5. The apparatus of claim 3, wherein the subtractive apparatus comprises a container, the container being configured for containing a liquid, which liquid includes a solvent or degrading material that is used for removing material from the at least some regions of the substrate layers where the adhering agent has not been deposited from the substrate layers.

6. The apparatus of claim 1, further comprising at least one alignment mechanism configured to accurately align the powdered substrate layers into a stack.

7. The apparatus of claim 1, further comprising a heating element, the heating element being configured for transforming the powder into matter that flows and then hardens into a hardened substance, which hardened substance binds layers of sheet-like substrate material together and is disposed in a spatial pattern that infiltrates the layers that combine to form the three-dimensional (3D) object.

8. The apparatus of claim 1, wherein the mechanism for selectively depositing the adhering agent is at least one inkjet printhead.

9. The apparatus of claim 1, wherein the artificial pressure source is chosen from the group consisting of: a press, clamp, iron, roller, pump, piston, spring, or elastic element.

10. An apparatus for fabricating a three-dimensional (3D) object, comprising:
    a mechanism for selectively depositing an adhering agent in a desired pattern onto portions of sheet-like substrate material, wherein a layer of said sheet-like material corresponds to a layer of the three-dimensional (3D) object;
    at least one applicator configured for applying powder onto the sheet-like substrate material;
    a removal mechanism to remove loose powder;
    a heating element, the heating element being configured for transforming the powder into matter that flows and then hardens into a hardened substance, which hardened substance binds layers of sheet-like substrate material together and is disposed in a spatial pattern that infiltrates the layers that combine to form the three-dimensional (3D) object; and
    an artificial pressure source, the pressure source being configured for applying pressure to one or more of the layers;
    wherein the pressure is applied during softening of the powder.

11. The apparatus of claim 10, further comprising a processor, wherein the processor is adapted to output control signals to control the selectively depositing of the adhering agent, the applying of powder, and the removal of the loose powder, for each of the at least some substrate layers, respectively, in accordance with digital data that specifies different slices, respectively, of the 3D object.

12. The apparatus of claim 10, further comprising a subtractive apparatus configured for removing at least some regions of the substrate layers where the adhering agent has not been deposited from the substrate layers.

13. The apparatus of claim 12, wherein the subtractive apparatus removes excess substrate by one or more of dissolution, polymer degradation, mechanical abrasion, or melting.

14. The apparatus of claim 12, wherein the subtractive apparatus comprises a container, the container being configured for containing a liquid, which liquid includes a solvent or degrading material that is used for removing material from the at least some regions of the substrate layers where the adhering agent has not been deposited from the substrate layers.

15. The apparatus of claim 10, further comprising at least one alignment mechanism configured to accurately align the powdered substrate layers into a stack.

16. The apparatus of claim 10, wherein the mechanism for selectively depositing the adhering agent is at least one inkjet printhead.

17. The apparatus of claim 10, wherein the artificial pressure source is chosen from the group consisting of: a press, clamp, iron, roller, pump, piston, spring, or elastic element.

18. The apparatus of claim 10, wherein the heating element is an oven.

19. An apparatus for fabricating a three-dimensional (3D) object, comprising:

a mechanism for selectively depositing an adhering agent in a desired pattern onto portions of sheet-like substrate material, wherein a layer of said sheet-like material corresponds to a layer of the three-dimensional (3D) object;

at least one applicator configured for applying powder onto the sheet-like substrate material;

a removal mechanism to remove loose powder;

at least one alignment mechanism configured to accurately align the powdered substrate layers into a stack; and an artificial pressure source, the pressure source being configured for applying pressure to one or more of the layers;

wherein the pressure is applied during softening of the powder.

20. The apparatus of claim 19, wherein the alignment mechanism comprises registration guide posts.

* * * * *